United States Patent
Thubert et al.

(10) Patent No.: US 10,433,191 B2
(45) Date of Patent: Oct. 1, 2019

(54) CHANNEL MANAGEMENT IN A VIRTUAL ACCESS POINT (VAP)

(71) Applicant: Cisco Technology, Inc., San Jose, CA (US)

(72) Inventors: Pascal Thubert, La Colle sur Loup (FR); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 74 days.

(21) Appl. No.: 15/864,554

(22) Filed: Jan. 8, 2018

(65) Prior Publication Data
US 2019/0215704 A1    Jul. 11, 2019

(51) Int. Cl.
| | |
|---|---|
| *H04L 12/28* | (2006.01) |
| *H04W 24/02* | (2009.01) |
| *H04W 92/20* | (2009.01) |
| *H04W 72/12* | (2009.01) |
| *H04W 88/08* | (2009.01) |

(52) U.S. Cl.
CPC ....... *H04W 24/02* (2013.01); *H04W 72/1205* (2013.01); *H04W 88/08* (2013.01); *H04W 92/20* (2013.01)

(58) Field of Classification Search
CPC ....................................................... H04L 12/28
USPC ......................................................... 370/329
See application file for complete search history.

(56) References Cited

U.S. PATENT DOCUMENTS

| | | |
|---|---|---|
| 2010/0232400 A1 | 9/2010 | Patil et al. |
| 2016/0373181 A1 | 12/2016 | Black et al. |
| 2017/0273017 A1 | 9/2017 | Gidvani et al. |
| 2018/0291449 A1* | 10/2018 | Khatri ............... C12Q 1/6883 |

OTHER PUBLICATIONS

Chen, et al., "Research on the Virtual Access Points in the Wireless Local Area Network", The Open Cybernetics & Systemics Journal, 2015, 9, pp. 1281-1288, Bentham Open.
"Overview of Wireless Virtual Access Point (VAP)", SonicWall Knowledge Base, https://www.sonicwall.com/en-us/support/knowledge-base/170505810128245, Accessed Nov. 8, 2017, 2 pages, SonicWall.
(Continued)

*Primary Examiner* — Dang T Ton
(74) *Attorney, Agent, or Firm* — Behmke Innovation Group LLC; James Behmke; Stephen D. LeBarron

(57) ABSTRACT

In one embodiment, a supervisory device in a network forms a first virtual access point (VAP) for a first node in the network. A plurality of access points (APs) in the network are mapped to the first VAP as part of a VAP mapping and the first node treats the APs in the VAP mapping as a single AP for purposes of communicating with the network. The supervisory device determines a communication schedule for the first node based on a radio chain of at least one of the APs in the VAP mapping for the first VAP being shared by the first VAP and a second VAP for a second node in the network. The supervisory device, according to the communication schedule for the first node, causes one or more of the APs in the VAP mapping for the first VAP to instruct the first node to stop transmitting for a period of time.

20 Claims, 18 Drawing Sheets

(56) References Cited

OTHER PUBLICATIONS https://superuser.com/questions/744065/what-is-an-antenna-chain-and-h . . . ; wireless networking; What is an antenna chain and how do I figure out the correct setting for my router?; 1 page.
802.11ac: A Survival Guide; http://chimera.labs.oreilly.com/books/1234000001739/ch01.html#beamf . . . ; pp. 1-8.
Jason Hintersteiner; https://www.networkcomputing.com/wireless-infrastructure/how-does- . . . ; How Does MU-MIMO Work? | Network Computing; pp. 1-7.

* cited by examiner

CHANNEL MANAGEMENT IN A VIRTUAL ACCESS POINT (VAP)

TECHNICAL FIELD

The present disclosure relates generally to computer networks, and, more particularly, to channel management in a virtual access point (VAP).

BACKGROUND

The Internet of Things (IoT) is the internetworking of devices or objects (a.k.a., "things", e.g., sensors, actuators, nodes, vehicles, etc.) that collect and exchange data, control objects, and process data. Many IoT networks are formed on low-power lossy networks (LLNs), and utilize carrier sense multiple access with collision avoidance (CSMA/CA) techniques. CSMA/CA, notably, is a communication technique that uses carrier sensing, where nodes attempt to avoid collisions by transmitting only when the channel is sensed to be "idle."

In general, deterministic routing concerns ensuring that messages (e.g., packets) definitively arrive at a destination at a specific time or within a specified time range. However, implementing determinism in hub-and-spoke IoT models, particularly with CSMA/CA, faces a litany of drawbacks, such as overwhelming a server with multiple copies of traffic, excessive delay, surges in latency, and unacceptable frame loss.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
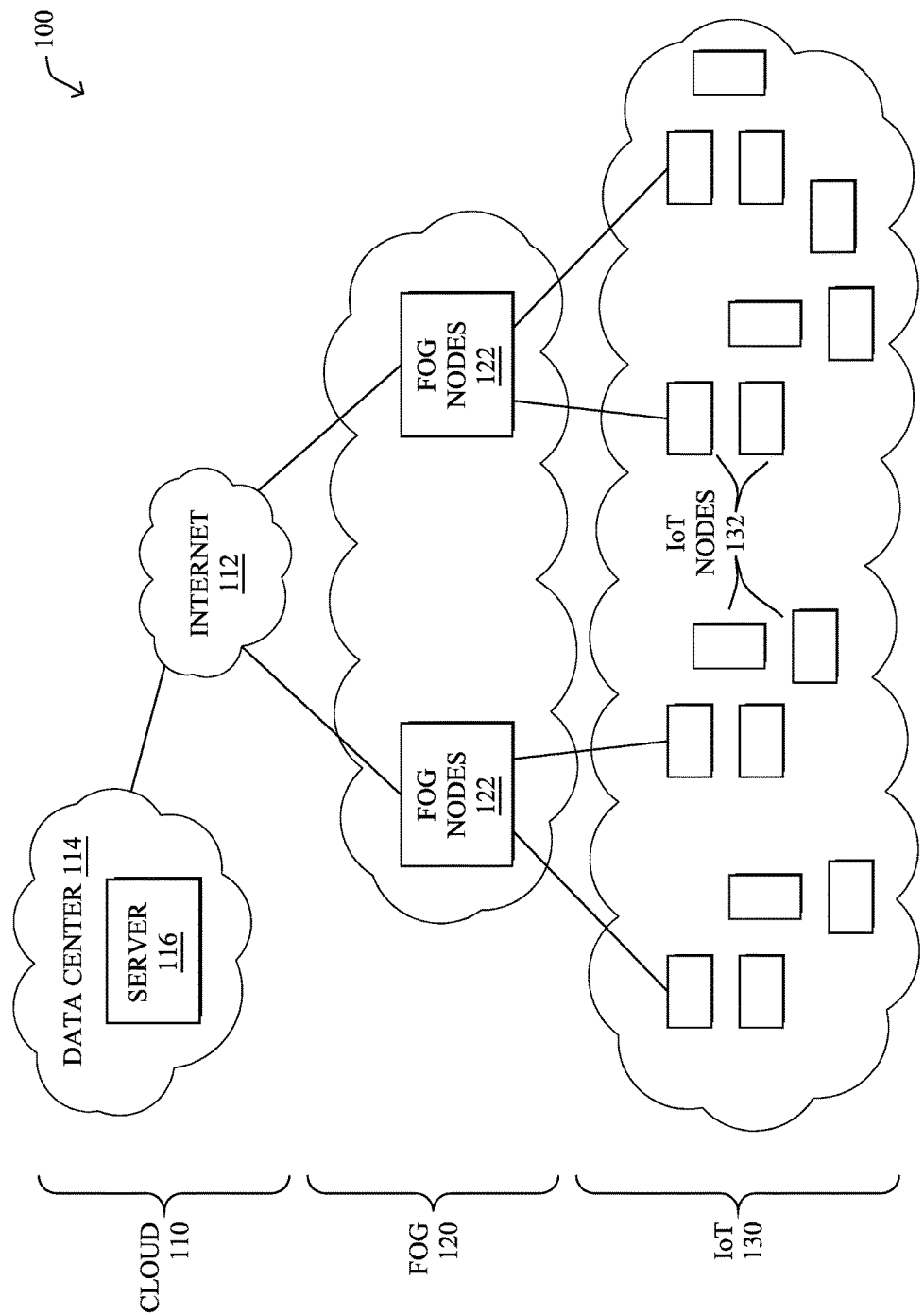
FIG. 1 illustrates an example communication network.

According to one or more embodiments of the disclosure, a supervisory device in a network forms a first virtual access point (VAP) for a first node in the network. A plurality of access points (APs) in the network are mapped to the first VAP as part of a VAP mapping and the first node treats the APs in the VAP mapping as a single AP for purposes of communicating with the network. The supervisory device determines a communication schedule for the first node based on a radio chain of at least one of the APs in the VAP mapping for the first VAP being shared by the first VAP and a second VAP for a second node in the network. The supervisory device, according to the communication schedule for the first node, causes one or more of the APs in the VAP mapping for the first VAP to instruct the first node to stop transmitting for a period of time.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), PLC protocols, or other shared-media protocols where appropriate. In this context, a protocol consists of a set of rules defining how the nodes interact with each other.

Figure 2:
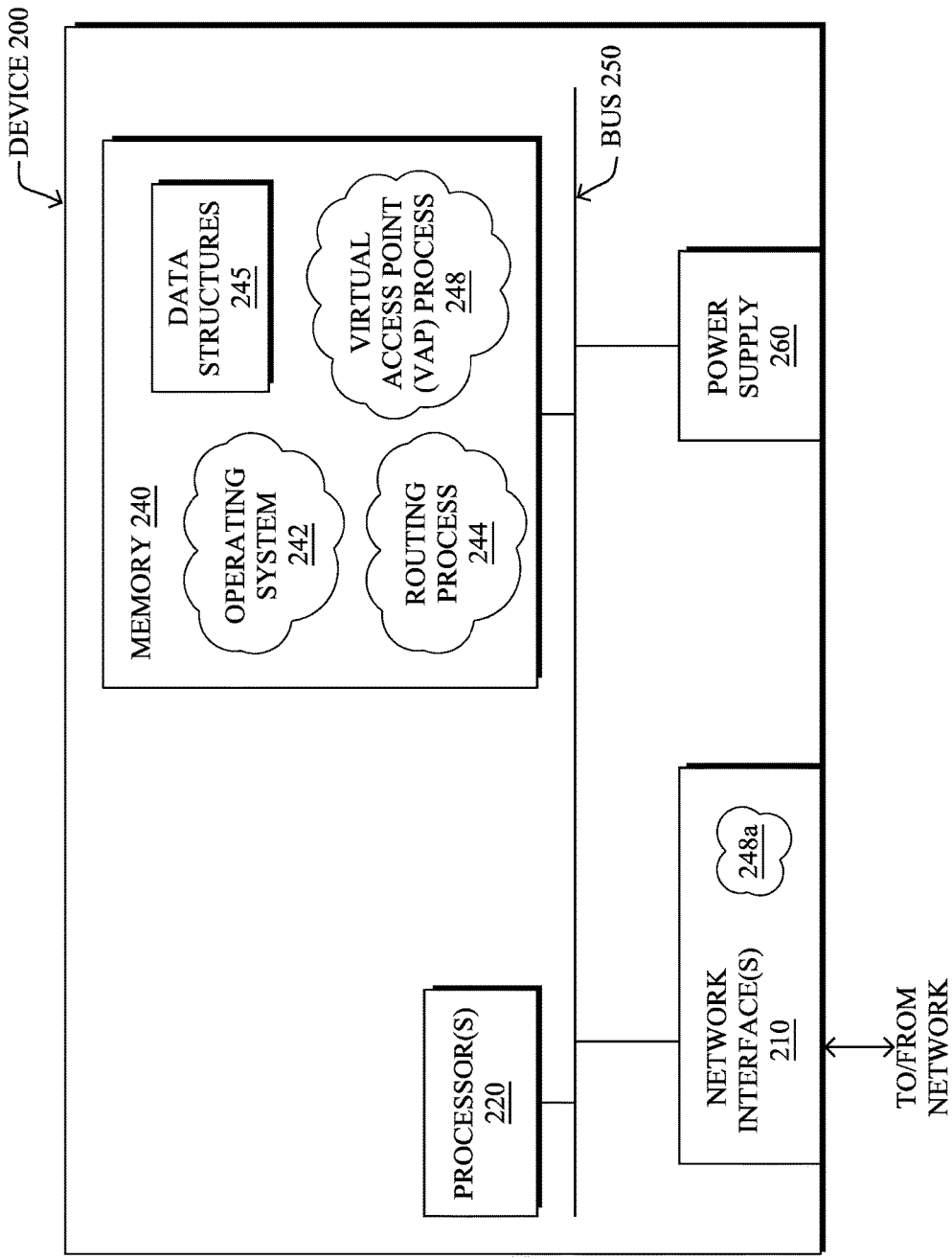
FIG. 2 illustrates an example network device/node.

FIG. 2 is a schematic block diagram of an example node/device 200 that may be used with one or more embodiments described herein, e.g., as any of the nodes or devices shown in FIG. 1 above or described in further detail below. The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. Operating system 242, portions of which is typically resident in memory 240 and executed by the processor, functionally organizes the device by, inter alia, invoking operations in support of software processes and/or services executing on the device. These software processes and/or services may comprise routing process/services 244 and an illustrative virtual access point (VAP) process 248, as described herein. Note that while VAP process 248 is shown in centralized memory 240, alternative embodiments provide for the process to be specifically operated within the network interfaces 210, such as a component of a MAC layer (e.g., process 248a).

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

In general, VAP process 248 includes computer executable instructions that, when executed by processor(s) 220, cause device 200 to perform operations regarding the formation, adjustment, and operation of a VAP within the network. These operations are described in greater detail below. In some embodiments, process 248 may employ any number of machine learning techniques, to perform these operations. In general, machine learning is concerned with the design and the development of techniques that receive empirical data as input (e.g., data regarding the performance/characteristics of the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, process 248 can use the model M to classify new data points, such as information regarding the performance/characteristics associated with an established VAP or its underlying APs, to adjust the VAP, accordingly. Often, M is a statistical model, and the cost function is inversely proportional to the likelihood of M, given the input data.

In various embodiments, VAP process 248 may employ one or more supervised, unsupervised, or semi-supervised machine learning models to analyze traffic flow data. Generally, supervised learning entails the use of a training dataset, which is used to train the model to apply labels to the input data. For example, the training data may include sample network data that may be labeled simply as representative of a "good connection" or a "bad connection." On the other end of the spectrum are unsupervised techniques that do not require a training set of labels. Notably, while a supervised learning model may look for previously seen network data that has been labeled accordingly, an unsupervised model may instead look to whether there are sudden changes in the performance of the network and/or the VAP. Semi-supervised learning models take a middle ground approach that uses a greatly reduced set of labeled training data.

Example machine learning techniques that process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly labeled a connection as bad. Conversely, the false negatives of the model may refer to the number of connections that the model labels as 'good,' but are, in fact, of poor quality to the user or endpoint node. True negatives and positives may refer to the number of times the model correctly classifies a connection as good or bad, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives. In some cases, process 248 may also use reinforcement learning techniques which generally act to use feedback about the ML predictions, to adjust the underlying model. For example, an indication of a false positive from an expert (e.g., a supervisory system or user) may be used to adjust the underlying model, to avoid such predictive mistakes in the future.

As mentioned above, various protocols have been established for the IoT, including, in particular, various "hub-and-spoke" models, such as Bluetooth Low Energy, DECT-Ultra Low Energy, IEEE 802.15.4 (with no meshing), and Low Power Wi-Fi. However, there is also a lack of determinism in these models due to prevalent use of carrier sense multiple access with collision avoidance (CSMA/CA) for wireless communications. Notably, deterministic networking requires that the worst-case data loss and latency should be guaranteed in a consistent fashion as multiple services are deployed on a common converged network infrastructure.

This determinism is key to many applications, such as safety and process control. To complicate matters further, considering the vast amounts of devices that are currently being installed in various IoT networks, an important constraint to be placed on any solution is that changes at the end device (e.g., IoT device/thing) should not be necessary. This would also enable connection of legacy devices, thereby addressing a much wider market of applicability.

Virtual Access Point (VAP) Formation

The techniques herein introduce a methodology that can be used with existing IoT infrastructure to implement a virtual access point (VAP) that is unique to a given IoT node. In general, the VAP is a logical entity that appears to the endpoint node as a normal AP to which the node associates as normal. In practice, however, the VAP is physically distributed over a number of APs surrounding the device. In another aspect, a supervisory device in the network may control the AP membership in the VAP, such as by transferring AP membership in the network while the node moves and without requiring the node to roam. In further aspects, a machine learning model of the supervisory device may oversee the VAP and adjust the VAP mapping, accordingly. Such a machine learning model may reside in the supervisory device (e.g., controller, cloud service, etc.) in a centralized mode, or in a distributed manner across the APs. Depending on the traffic criticality, more or less of those APs may copy a given frame received from the endpoint node to the supervisory device.

Illustratively, the techniques described herein may be performed by hardware, software, and/or firmware, such as in accordance with virtual access point process 248, which may include computer executable instructions executed by processor 220 (or independent processor of interfaces 210) to perform functions relating to the techniques described herein. In particular, VAP process 248 may be a component of an IoT device, a cloud device, or any other participating device for the techniques described herein.

Specifically, according to one or more embodiments of the disclosure, a supervisory device in a network receives from a plurality of APs in the network data regarding a network availability request broadcast by a node seeking to access the network and received by the APs in the plurality. The supervisory device uniquely associates the node with a VAP for the node and forms a VAP mapping between the VAP for the node and a set of the APs in the plurality selected based on the received data regarding the network availability request. One of the APs in the mapping is designated as a primary access point for the node. The supervisory device instructs the primary AP to send a network availability response to the node that includes information for the VAP. The node uses the information for the VAP to access the network via the set of APs in the VAP mapping.

Operationally, the techniques herein specify an architecture and protocol between a supervisory device in a network (e.g., a controller, such as a network server) and a plurality of network access points (APs). The supervisory device may be configured for use with any of the technologies, noted above. Note that the techniques herein illustratively place a number of functions in the supervisory device, such as components hosting Machine Learning (ML) processes, also referred to as "learning machines") that are mostly technology-independent. In some embodiments, these processes may be implemented in a distributed manner (e.g., across different APs), in which case the collective set of APs may be viewed as the supervisory device.

More specifically, the techniques herein enable the formation and use of a VAP that appears to always be "near" an endpoint node, so that quality of transmission and PHY speed can be maintained. A VAP may be instantiated within a set of APs around the node, and the set may vary automatically under the control of the supervisory device (e.g., a controller hosting a machine learning model) within the infrastructure. Thus, the device never needs to make a decision of roaming, which is a paradigm change in Wi-Fi and other wireless networks. Also, since multiple APs can receive a same packet at a same time with unrelated probabilities, the overall chances of reception are increased and delays related to retries are reduced, thus helping with determinism.

Generally, a VAP may include any number of physical APs in the network that are placed in groups of equivalence, all using the same channel and security settings. When a node (e.g., a STA) associates with the network, the supervisory device (e.g., controller) may select a set of APs that together form a VAP for the associated node. The set may be changed as the node moves. In this way, the endpoint node may experience a constant service from the network and does not roam. For joining, the node may interact with one of the APs (e.g., a primary networking AP) and may use a unique network identifier associated with the VAP, such as a unique service set identifier (SSID), a PAN-ID, or the like, that the node uses to access the network. The supervisory device may also optimize the set of APs based on an objective function and on the observed traffic in the network. Diversity is obtained because multiple members of the VAP may receive the same packet from the node, with relatively independent chances of success.

The illustrative VAP protocol described herein also integrates well with deterministic networking (DetNet). In particular, the VAP protocol enables multiple APs to receive a packet from an endpoint node at the same time, creating a natural replication mechanism in which multiple copies of a same packet may be captured, each by a different AP participating in the VAP assigned to the node. Those APs may be connected over different networks and the packet may circulate to the router or the final destination over segregated paths. DetNet elimination may then be used to eliminate duplicate copies, if any. The VAP protocol herein also leverages various networking techniques (e.g., Wi-Fi, controllers, ML processes, etc.), to improve the user experience while maintaining compatibility with the existing network standards and existing endpoint nodes, by creating a virtual AP that is always there and always optimized so the node never tries to roam.

Figure 3A:
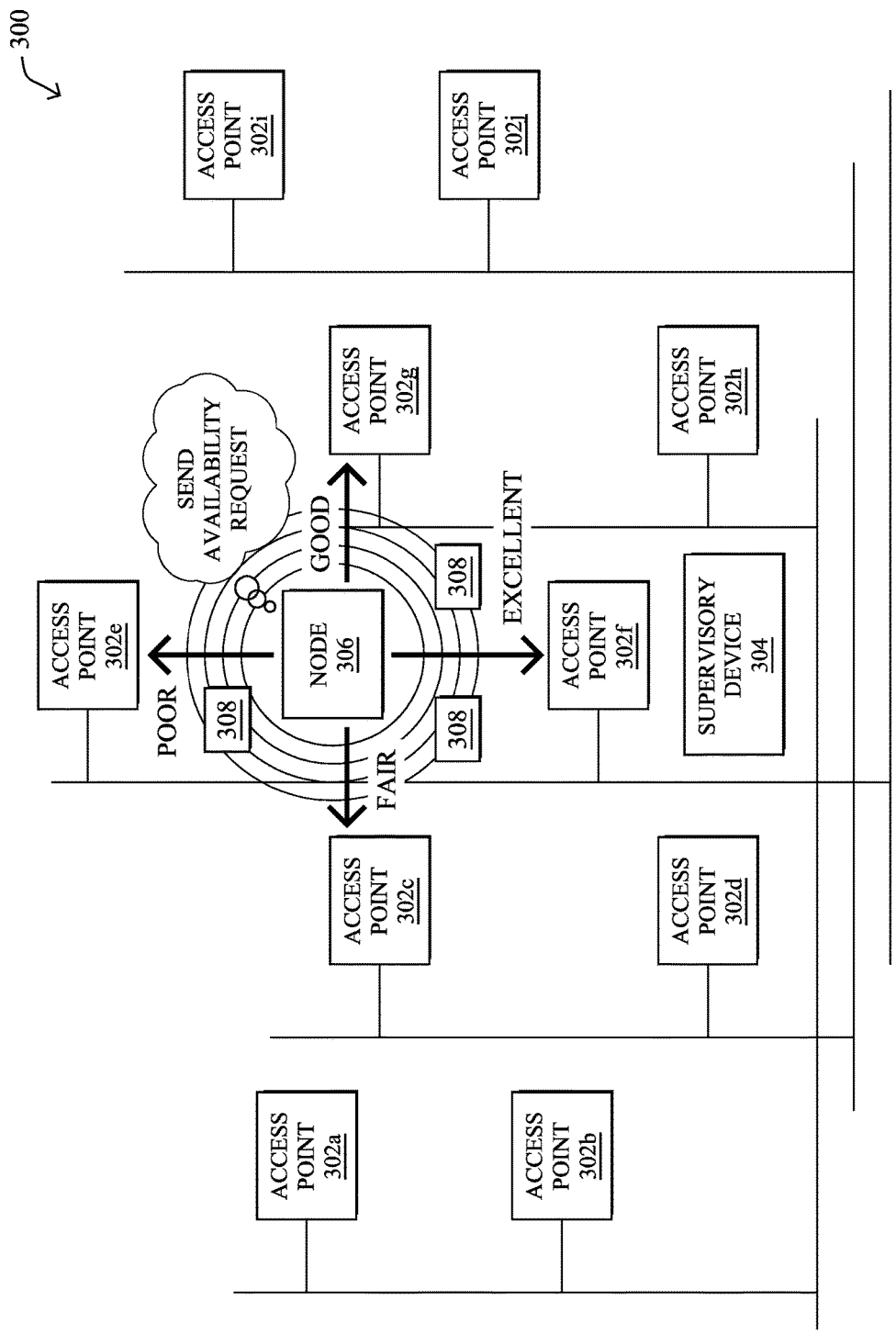
FIGS. 3A-3D illustrate an example of virtual access point (VAP) formation.

FIGS. 3A-3D illustrate an example of virtual access point (VAP) formation, according to various embodiments. As shown in FIG. 3A, assume that there exists a portion 300 of a network that includes a plurality of APs 302 (e.g., APs 302a-302j) that are located in different physical locations through an area (e.g., a building, campus, etc.). APs 302 may be in communication with a supervisory device 304 in the network, such as a wireless controller, other networking device, or, alternatively, a remote device, such as a server located in a data center or cloud computing environment.

Now, assume that a node 306 is attempting to access the network. In such a case, node 306 may broadcast a network availability request 308. The specific format of request 308 may be a function of the specific wireless protocols in use by the network. For example, in the case of 802.11 networks, availability request 308 may be a probe request. As would be appreciated, from the standpoint of node 306, the expected availability response would include an identifier for the available network, such as the SSID of the Wi-Fi network. Reception of availability request 308 by any of APs 302 may trigger the formation of a VAP for node 306, in various embodiments. In further embodiments, a VAP may also be formed at any time after node 306 associates with the network.

In many network implementations, a plurality of APs 302 may receive the broadcast network availability request 308 from node 306, with varying results. Notably, APs 302 within range of node 306 may, by virtue of receiving request 308, capture data regarding request 308, including the contents of request 308 and other characteristics of the received request 308 such as, but not limited to, a link quality indicator (LQI), a signal to noise ratio (SNR), or received signal strength indicator (RSSI), or the like. For example, as shown, AP 302f, which is physically located closest to node 306, may determine that the quality of the received request 308 is "excellent." Similarly, APs 302g, 302c, and 302e may determine that the quality of the received request 308 is "good," "fair," and "poor," respectively.

Figure 3B:
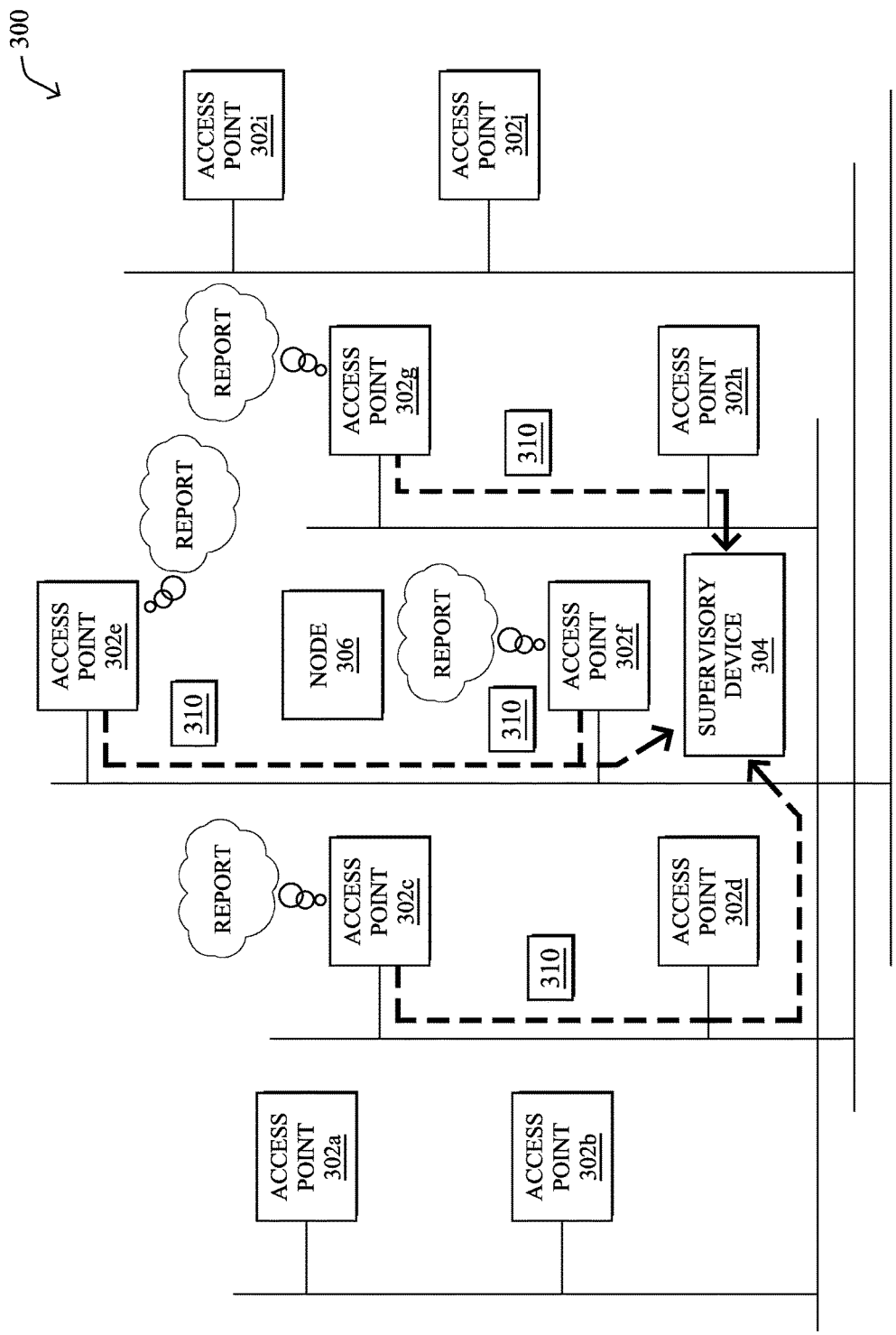

In various embodiments, rather than simply responding to request 308 with the requisite information needed for node 306 to associate with the network, the receiving APs 302 may instead report the captured data regarding request 308 to supervisory device 304. In particular, as shown in FIG. 3B, APs 302c, 302e, 302f, and 302g may send the data 310 regarding the received network availability request 308 from node 306 to supervisory device 304, thereby triggering the formation of a VAP for node 306. Data 310 may include, for example, the identity of the sending AP 302 that received request 308, a MAC address or other networking device identifier for node 306, security status information, and/or at least one metric of the quality of the communication with the node (e.g., signal strength, signal to noise ratio, signal quality, etc.).

Figure 3C:
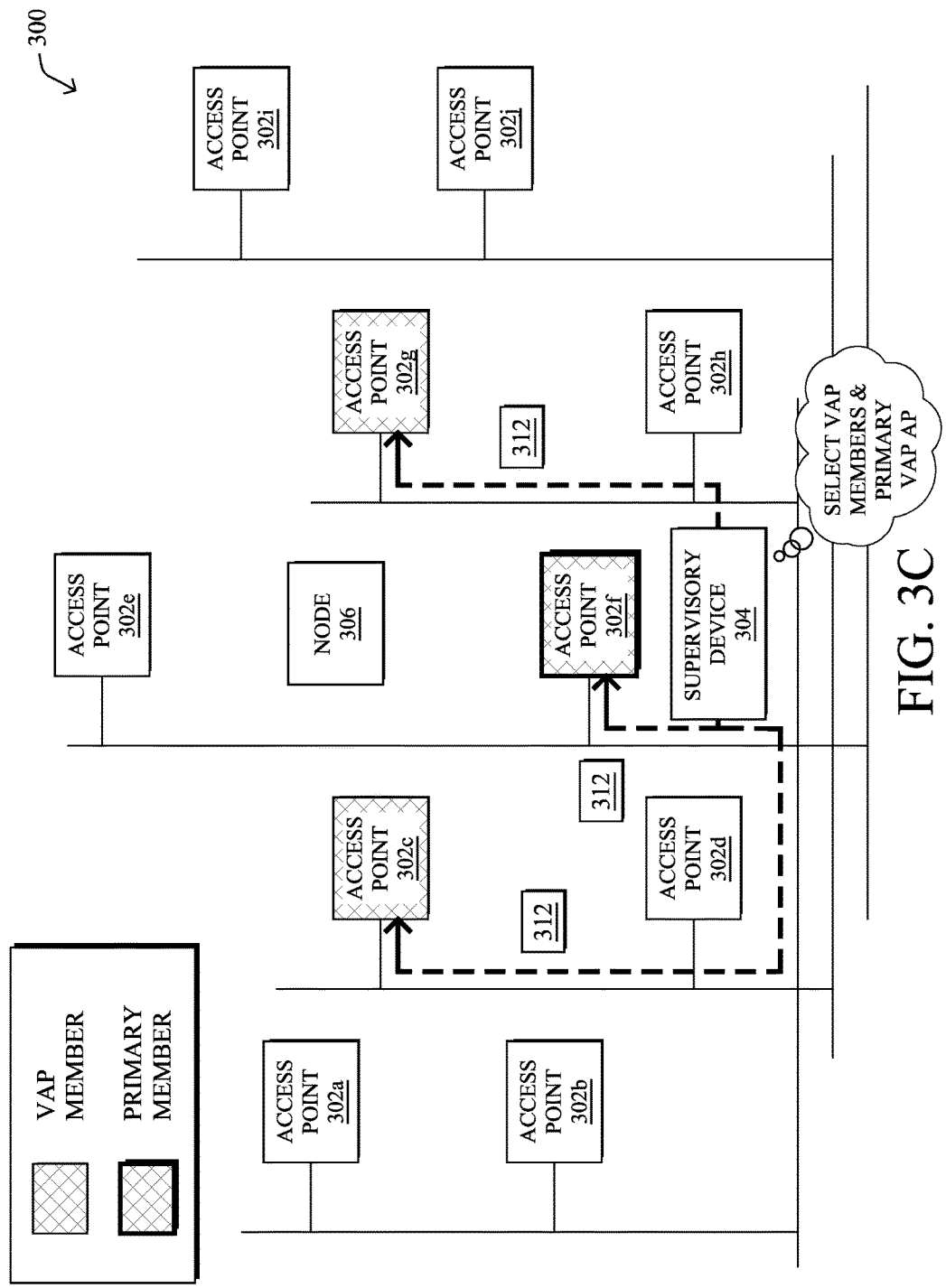

In FIG. 3C, the supervisory device 304 may create a virtual AP (VAP) that is unique to node 306. In general, the VAP may be mapped to any number of APs 306 selected by supervisory device 304 based in part on the data 310 regarding the availability request 308 received by the various APs 302. In other words, the VAP may be a logical construct that is distributed over multiple APs 302. For example, even though APs 302c, 302e, 302f, and 302g received association request 308 from node 306, supervisory device 306 may determine that the set of APs 302 in the VAP mapping for node 306 should only include APs 302c, 302f, and 302g, based on the quality of the received request 308 (e.g., AP 302e may be excluded from the VAP based on the poor quality of the received broadcast signal).

In addition to selecting the VAP member APs 302, supervisory device 304 may also designate one of the selected APs 302 as the primary AP 302 for the VAP. For example, based on data 310 regarding the availability request 308 sent by node 306, supervisory device 304 may determine that AP 302f has the best signal quality and should be the primary AP within the VAP for node 306. In turn, as shown in FIG. 3C, supervisory device 304 may send instructions 312 to the selected APs 302c, 302f, and 302g that include information regarding the VAP. For example, instructions 312 may instruct the selected APs 302c, 302f, and 302g to belong to the VAP for node 306, as identified initially by MAC address of node 306 and, as soon as it is available, by security token, and/or other cryptographic methods.

To implement the VAP in the network, supervisory device 304 may employ a VAP protocol, in order to exchange configuration and data packets with the APs 302. This protocol may be seen as an extension to existing protocols, such as Lightweight Access Point Protocol (LWAPP) and Control and Provisioning of Wireless Access Points (CAP-WAP), or may be specified as a new protocol. For example, the exchanges of data 310 and instructions 312 may use this VAP protocol.

Figure 3D:
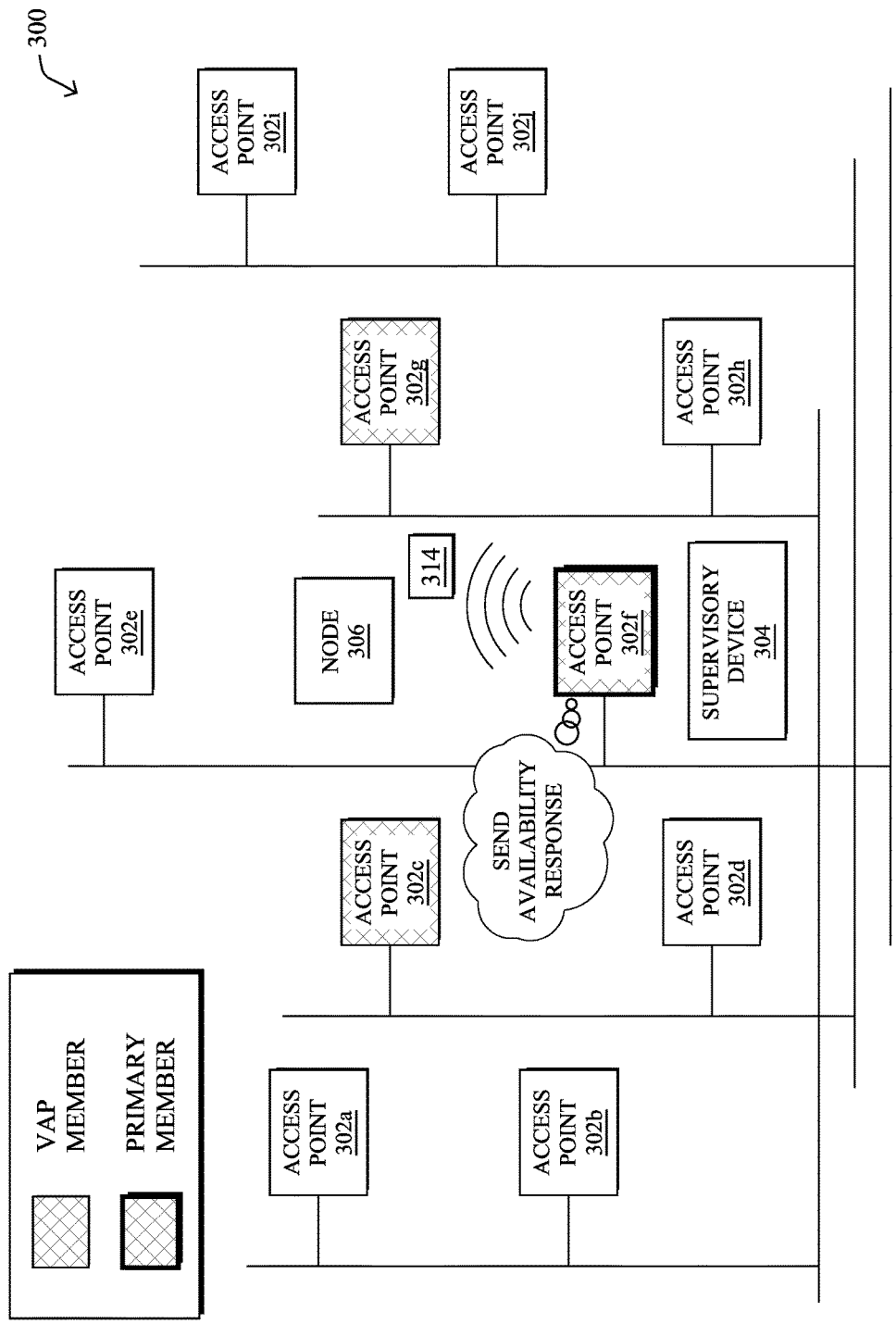

As shown in FIG. 3D, once the VAP has been generated and APs 302c, 302f, and 302g selected for mapping to the VAP, the primary AP 302f may send a network availability response 314 back to node 306. For example, response 314 may be a unicast probe response that has the same information as a beacon frame. In various embodiments, response 314 sent by primary AP 302f to node 306 may also include a unique network identifier associated with the VAP. For example, response 314 may include an SSID or PAN-ID generated by supervisory device 304 specifically for use with the VAP. In turn, node 306 may use the received response 314 to associate with the network, as it would under normal conditions. From the standpoint of node 306, it is associating with the network normally via AP 302f and may remain unaware of the existence of its associated VAP.

Figure 4A:
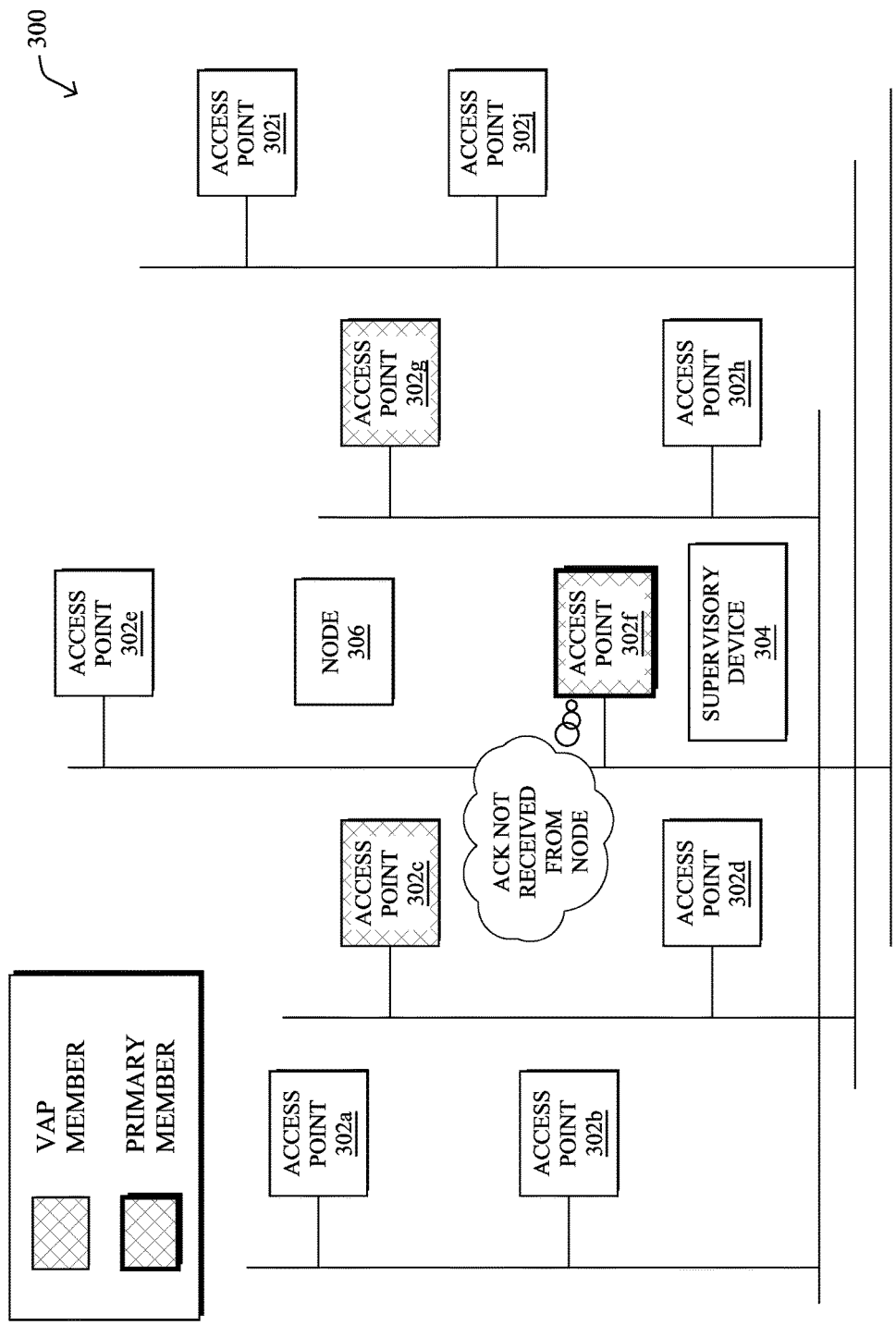
FIGS. 4A-4B illustrate an example of the operation of a VAP.
Figure 4B:
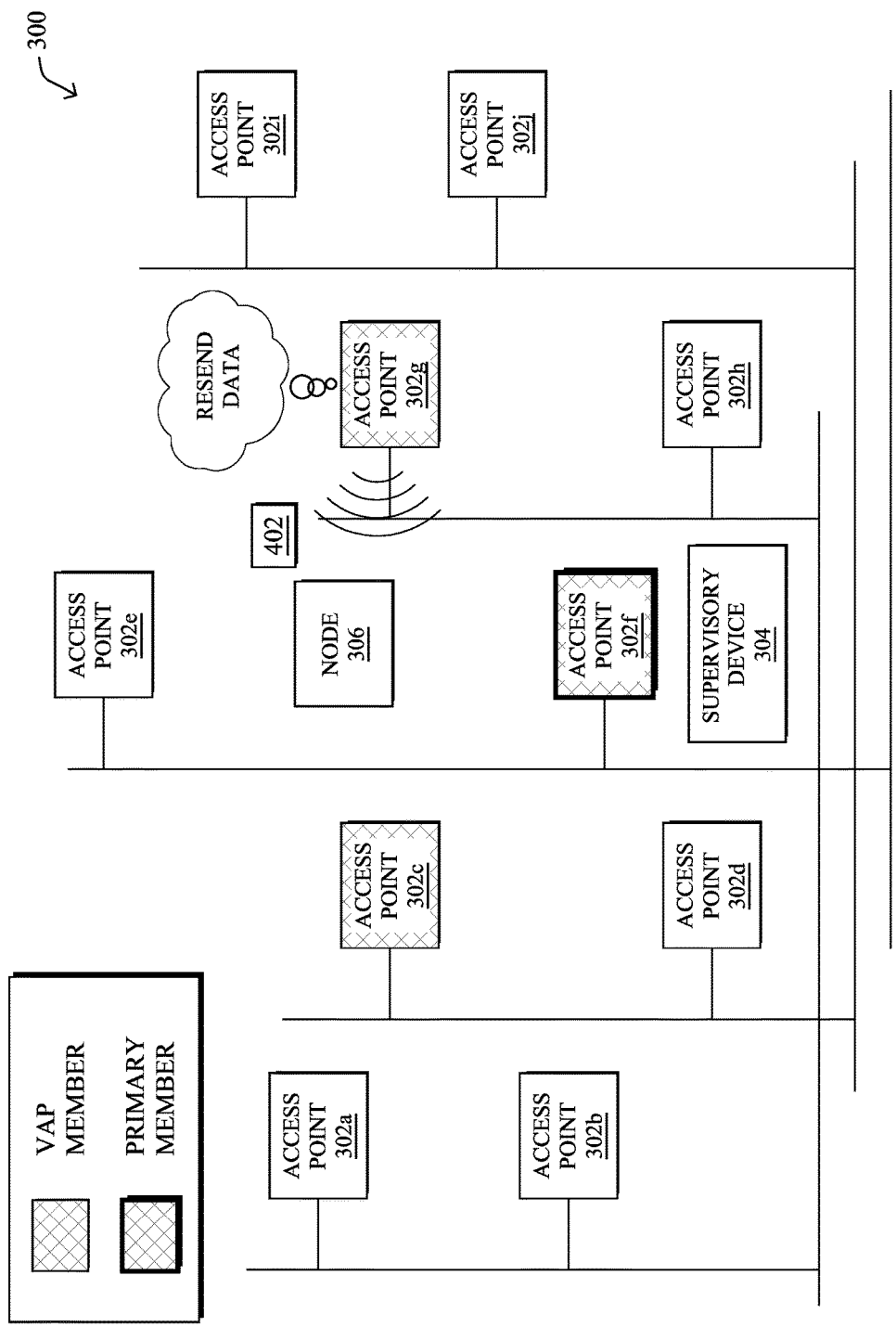

FIGS. 4A-4B illustrate an example of the operation of a VAP after formation, according to various embodiments. Continuing the examples of FIGS. 3A-3D, when forming the VAP for node 306, supervisory device 304 may also build an ordered list of the other APs 302 in the VAP mapping and conveyed to the selected APs 302 via instructions 312. In general, the ordered list may be used to add special diversity and improve the chances of a successful reception versus a retry from a given AP 302 that has already failed once. For example, as shown in FIG. 4A, assume that primary AP 302f has sent a message to node 306, but that message has not been acknowledged by node 306. Under normal circumstances, AP 302f would then attempt to retry sending the message again to node 306. However, according to various embodiments, as shown in FIG. 4B, AP 306g may instead resend the message 402 to node 306. Because the resend is sent from a different AP, the added spatial diversity increases the chances that the resent message 402 is received and acknowledged by node 306.

In various embodiments, learning machines may play a key role in the assignment of APs to a VAP and/or in the adjustment of an existing VAP. For example, such a learning machine may be trained to select APs 302 for inclusion in a given VAP based on a location estimation for the corresponding node (e.g., from data 310) and/or the desired optimization for the traffic expected from that type of node. For example, the location of node 306 may be derived from a Time Difference of Arrival value (TDOA or DTOA) and/or using triangulation between different APs 302.

Such a traffic optimization may be based on a history of traffic for the type of node, in some cases. As would be appreciated, the type of approach taken by the learning machine(s) may also vary with the specific objective function for the traffic and node type. For example, assume that node 306 is a particular type of telepresence device and that video traffic from similar devices has required a certain degree of network performance (e.g., in terms of drops, delay, jitter, etc.). In such a case, the learning machine may use its model for this node type, as well as any necessary metrics from the APs 302 in the network, to select an appropriate VAP mapping to satisfy the objective function. Note that the objective function will also dramatically influence the set of metrics to be gathered from APs after the scanning phase but also during the lifetime of a VAP. Indeed, according to the objective function, the set of required features, in machine learning terms, may vary, and the frequency of AP selection for the VAP will also vary.

Figure 5A:
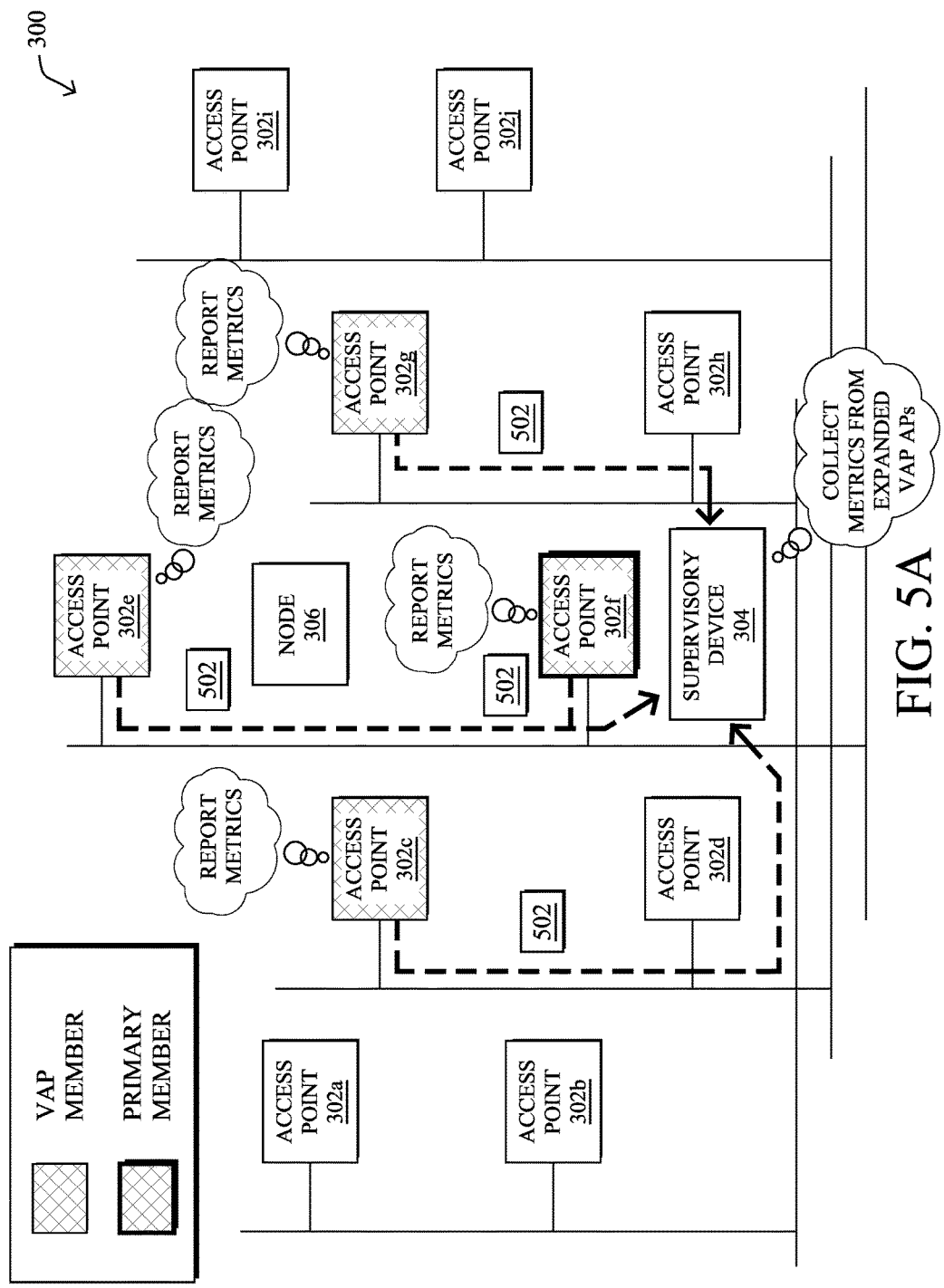
FIGS. 5A-5C illustrate an example of adjusting a VAP mapping.
Figure 5B:
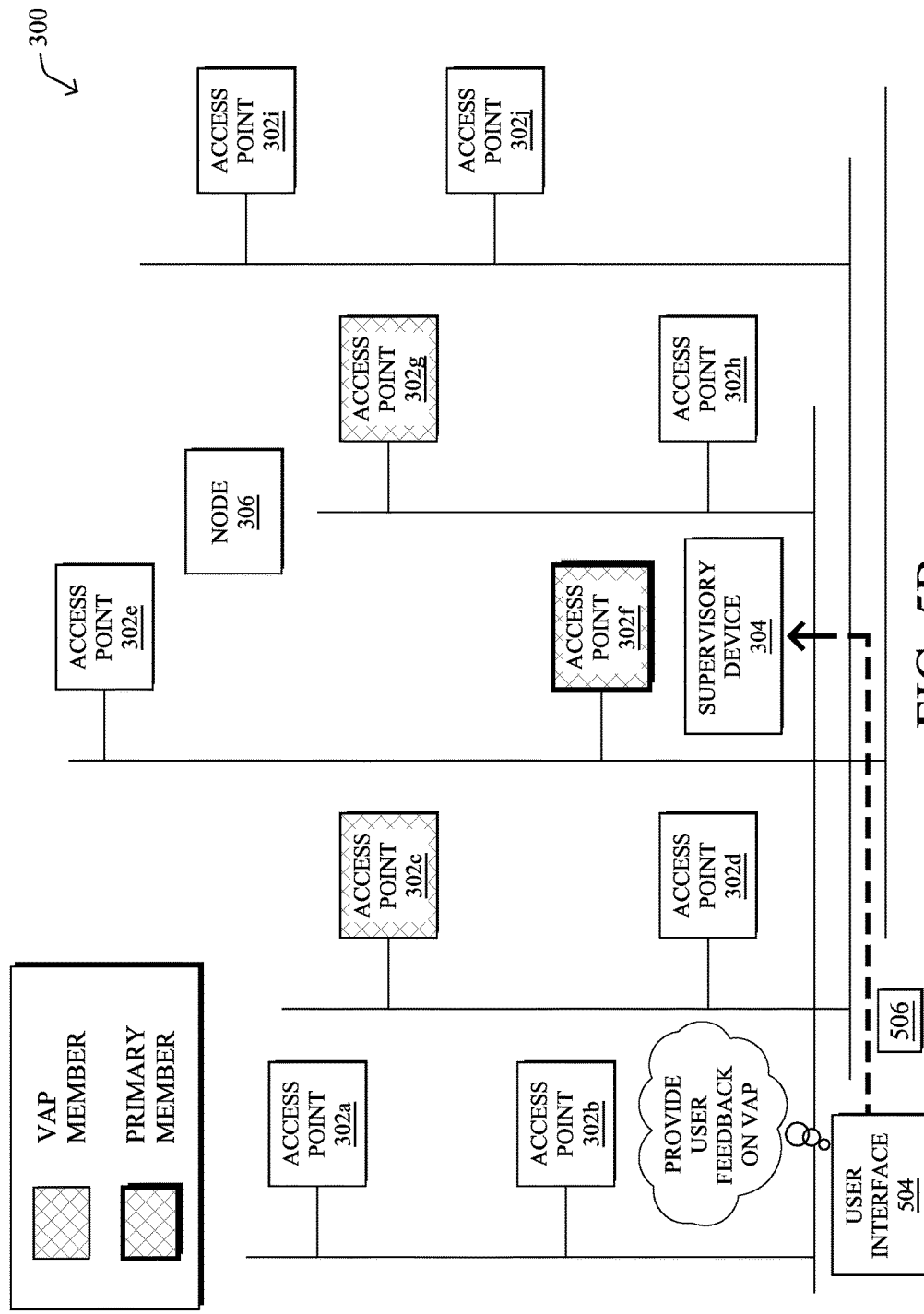
Figure 5C:
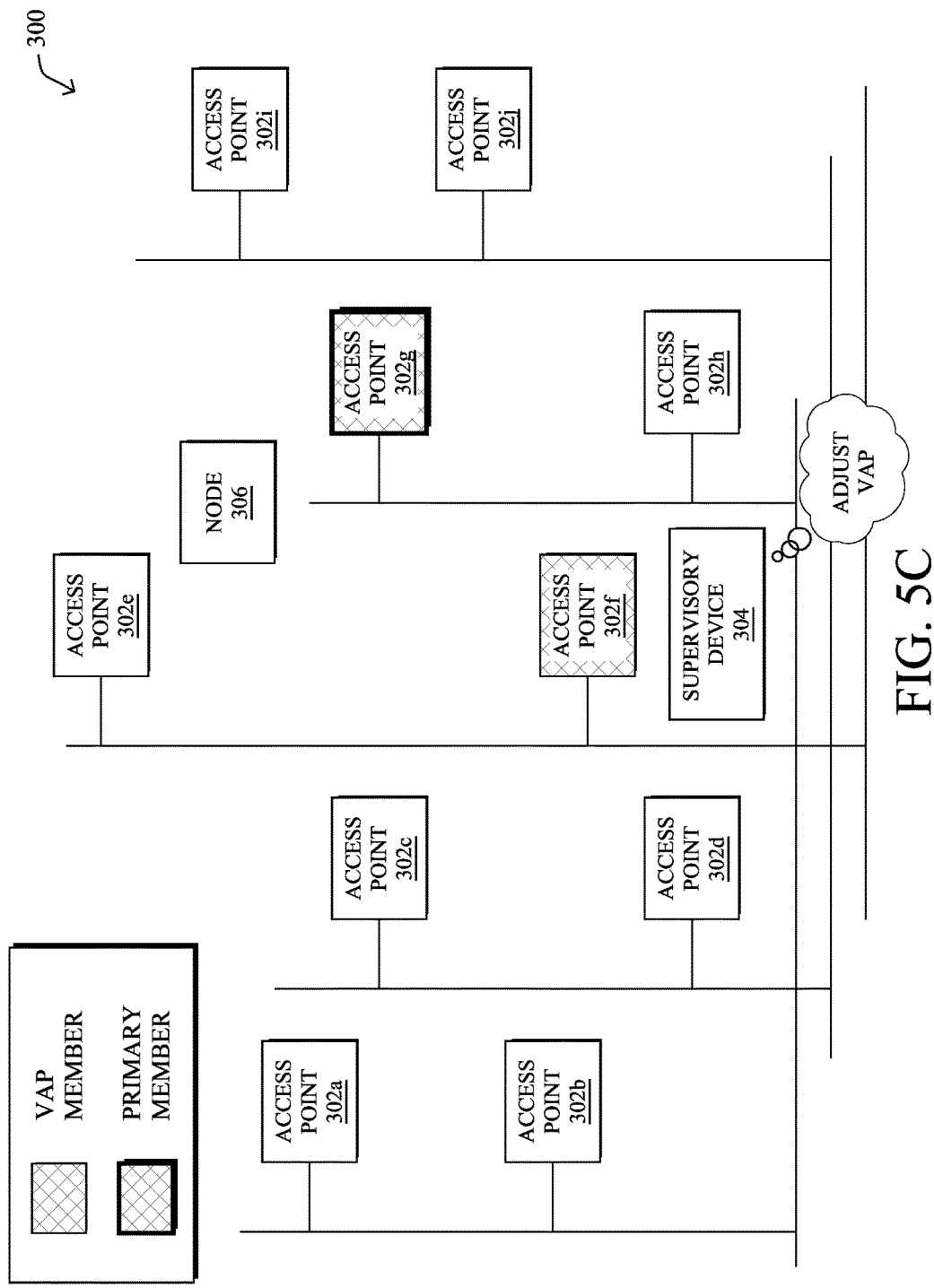

FIGS. 5A-5C illustrate an example of adjusting a VAP mapping, according to various embodiments. Even after formation of a VAP for a given node, supervisory device 304 may continue to monitor and adjust the VAP, in order to ensure that the objective function of the corresponding machine learning model for node 306 continues to be met. To do so, the following message types are introduced herein as part of the VAP protocol:

1.) VAP commands sent by the learning machine to APs 302, to gather metrics of interest (e.g., network characteristics/statistics), report the VAP group membership, etc.

2.) VAP metrics sent by the responding APs 302 to the learning machine and used by the objective function to compute the VAP membership (e.g., based on signal/noise ratio, signal strength, etc.).

3.) VAP stats reports sent by APs 302 to the learning machine and used to evaluate the VAP efficiency. Such stats reports may be used to gather statistical data used by the learning machine to determine the "efficiency" of the VAP group, which can be used by the learning machine to consistently adjust the VAP according to an objective function.

4.) Learning machine stats sent by learning machine to a user interface, to report objective function efficiency results.

In various embodiments, for purposes of collecting network metrics/characteristics and VAP stats from APs 302, supervisory device 304 may occasionally increase or otherwise adjust the APs in the VAP mapping. For example, as shown in FIG. 5A, supervisory device 304 may include AP 302e in the VAP mapping for purposes of data collection after formation of the VAP (e.g., via an instruction 312, even though AP 302e was not included in the original VAP mapping. This allows AP 302e to collect and report information that would not otherwise be possible using the original APs of the VAP. For example, by changing the set of APs, the learning machine can change the TDOA listeners and optimize the distance estimation, e.g., by adding APs while doing a measure, or triangulating between different sets of APs. Such collected information 502 may be reported to supervisory device 304, either on a push or pull basis. After the data collection, supervisory device 304 may opt to revert the VAP mapping back to its previous membership or make further adjustments to the AP memberships, accordingly.

As shown in FIG. 5B, supervisory device 304 may also convey data regarding the performance of the VAP (e.g., the objective function, etc.) to a user interface 504 for review by a user. In some embodiments, the learning machine may also use reinforcement learning to adjust its model for node 306 and make changes to the VAP mapping, accordingly. In such a case, the user of interface 504 (e.g., an admin device, etc.) may provide feedback 506 to the learning machine about the VAP efficiency, which is then used by the LM to adjust the strategy adopted to compute the VAP mapping.

Based on the captured network characteristics from the APs, the performance statistics for the VAP itself, and/or user feedback, the machine learning process may adjust the VAP by changing the APs in the VAP mapping. For example, as shown in FIG. 5C, assume that node 506 has move to a new physical location and is now in closer proximity to APs 302e and 302g. In such a case, supervisory device 504 may select a new set of APs 302 for the VAP of node 306 and send out corresponding instructions to the APs. Notably, as shown, supervisory device 304 may select a new set of APs for the VAP of node 306 that includes APs 302e, 302f, and 302g, with 302g now designated as the primary AP.

Thus, the generated VAP may add spatial diversity to any CSMA/CA LLN, in a manner somewhat akin to that of the LoRa model. However, in contrast to the techniques herein, LoRa uses different MAC operations and does not support the faster speeds of the components (e.g., PHY) used in today's IoT network devices. Additionally, LoRa does not support the association process, the use of identities (e.g., PAN-ID or SSID), and the automatic repeat request (ARQ) process for acknowledgement and retry, which are supported using the techniques herein. Further, LoRa does not support multicast communications, either.

As noted above, the VAP design enables the network to allocate a virtual AP for a given node/device, the virtual AP being impersonated by a collection of physical APs located around the node/device. The collection of APs is selected by a supervisory device, such as a controller, which updates the set of APs mapped to the VAP as the node moves around. Each VAP client resides on a given channel and may only roam to a different channel if there is no other possibility. This may still happen in order to load balance between frequencies, for instance.

Typically, a physical AP today has multiple radio chains, which allows for greater bandwidth, as well as beam forming. In particular, newer Wi-Fi APs leverage the concept of Multiple Ins, Multiple Outs (MIMO) in which multiple radio chains operate in parallel to increase the amount of data that any radio could transmit at a given time. In addition, the AP may also perform beamforming by running chains off of spatially diverse antennas and adding well adjusted phases, thereby focusing the energy on the client/node. Doing so improves the range and/or the signal quality, while also limiting the interference on others.

In some embodiments, all of the APs mapped to VAPs may have as many radio chains as there are channels used by their associated VAP-enabled devices/nodes. In such a case, these radio chains must be on at all times, so as not to lose connectivity. However, this limits the number of channels that are available for a VAP. Accordingly, channel management strategies may be employed, to better manage the channel usage of the physical APs that implement VAPs in a network.

Channel Management in a Virtual Access Point (VAP)

The techniques herein introduce the concept of virtual channels within a VAP. With virtual channels, VAPs can be enabled on more channels than the corresponding APs have actual radio chains. In some aspects, a channel may be used only part-time by a given VAP, although multiple VAPs can also share a same channel at a same time. Notably, the techniques herein introduce optimization and scheduling mechanisms, thereby allowing a given AP to support a greater number of VAPs/VAP clients than the AP has radio chains.

Specifically, according to one or more embodiments of the disclosure as described in detail below, a supervisory device in a network forms a first virtual access point (VAP) for a first node in the network. A plurality of access points (APs) in the network are mapped to the first VAP as part of a VAP mapping and the first node treats the APs in the VAP mapping as a single AP for purposes of communicating with the network. The supervisory device determines a communication schedule for the first node based on a radio chain of at least one of the APs in the VAP mapping for the first VAP being shared by the first VAP and a second VAP for a second node in the network. The supervisory device, according to the communication schedule for the first node, causes one or more of the APs in the VAP mapping for the first VAP to instruct the first node to stop transmitting for a period of time.

Illustratively, the techniques described herein may be performed by hardware, software, and/or firmware, such as in accordance with VAP process 248, which may include computer executable instructions executed by processor 220 (or independent processor of interfaces 210) to perform functions relating to the techniques described herein.

Operationally, the techniques herein add the concept of virtual channels to a network that implements VAPs. With virtual channels, VAPs can be enabled on more channels than a physical AP has actual radio chains. In some embodiments, the techniques herein introduce a mechanism whereby APs in a VAP mapping only need to listen to channels for which the physical AP has VAP enabled clients/nodes (e.g., Wi-Fi STAs). The supervisory device/controller that assigns VAP clients to APs optimizes the distribution of VAP clients in order to minimize the number of channels to which the AP has to listen at any given time. In addition, the radio chains may be dynamically assigned to different channels when they are needed for associated VAP clients, thereby allowing any free chains to be used for beamforming.

In further embodiments, the techniques herein introduce a scheduling mechanism whereby VAP clients/nodes are asked to refrain from using the wireless medium for short periods of time while the AP uses the radio chain on another channel. When the supervisory device/controller determines that it needs to use an AP for VAP clients that are distributed over more channels than the AP has radio chains, it may compute a communication schedule and pass it to the VAP members. Outside of the designated times of the schedule, the APs do not need to listen to the channel of the VAP member.

Figure 6A:
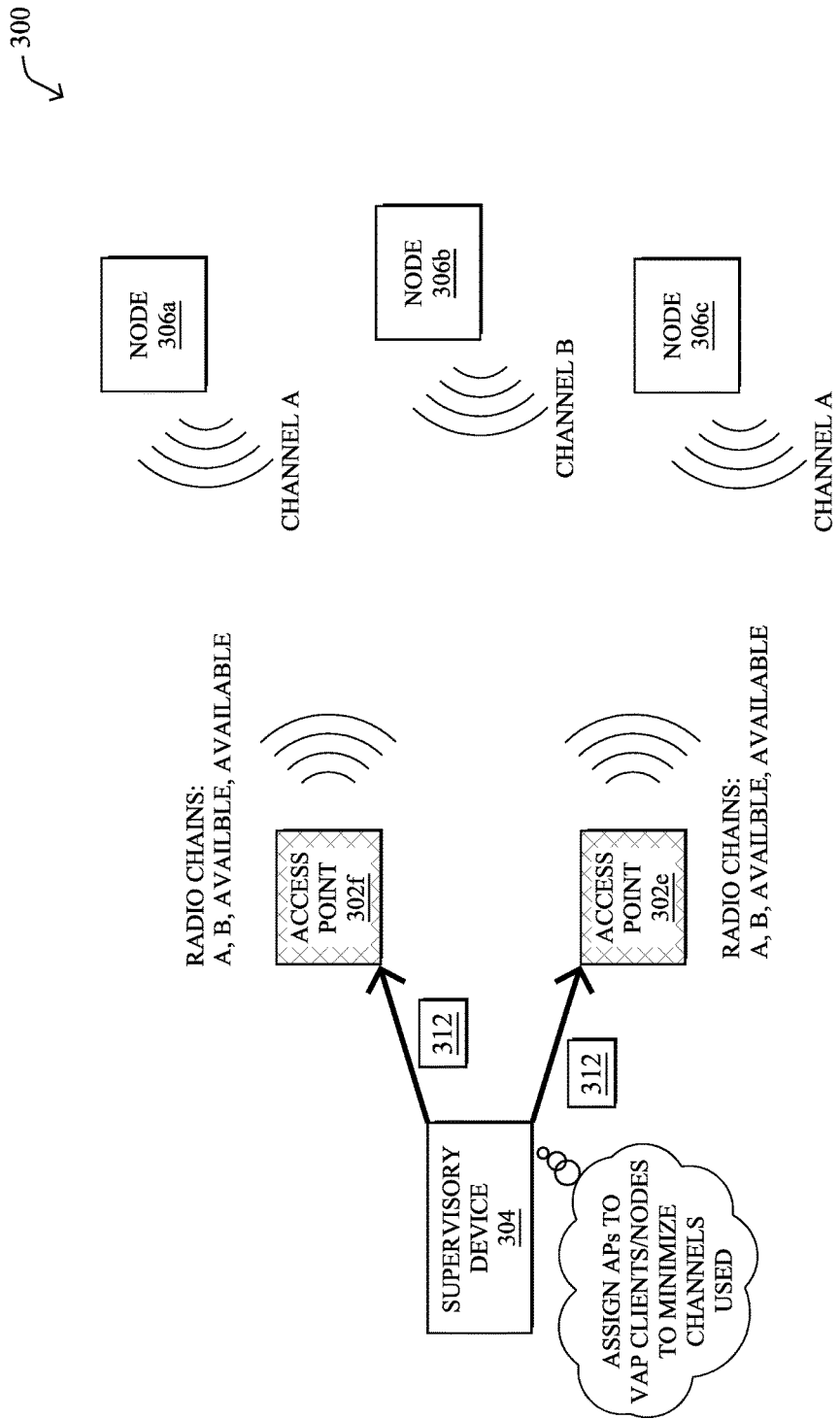
FIGS. 6A-6B illustrate an example of assigning APs to a VAP based on channel usage.
Figure 6B:
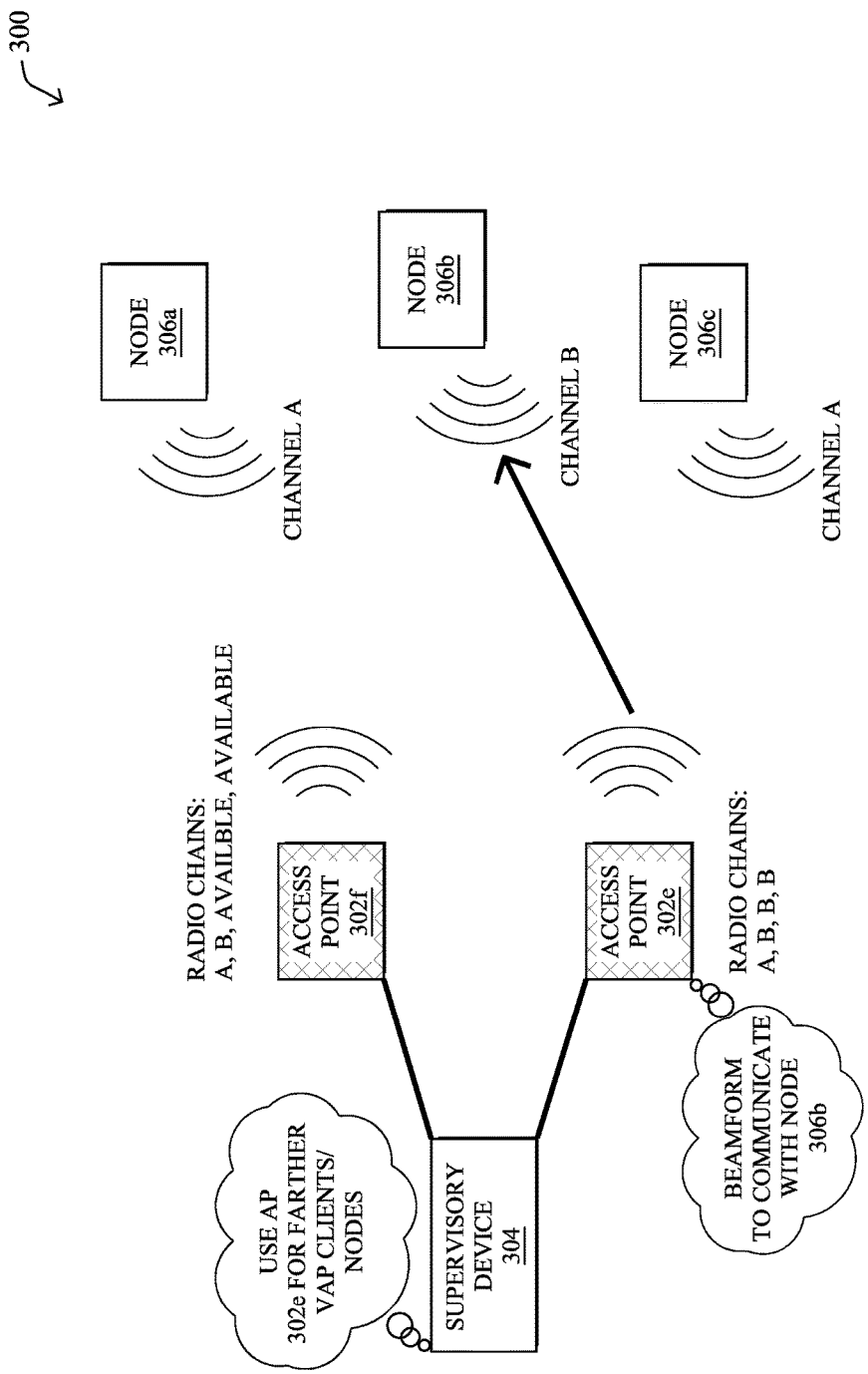

FIGS. 6A-6B illustrate an example of assigning APs to a VAP based on channel usage. As shown in FIG. 6A, assume that supervisory device 304 oversees access points 302e-302f and that there are a number of VAP clients in the network, such as nodes 306a-306c shown, each potentially having their own associated VAP. During operation, supervisory device 304 may assign a number of these nodes to a given AP, some being on the same channel and some not. For example, AP 306e may be assigned to nodes 306a-306c (e.g., and their corresponding VAPs) via instructions 312.

Depending on the VAP mappings, two cases are possible with respect to a given AP:

1.) The aggregated set of channels used by the VAP clients assigned to the AP is less than or equal to the number of radio chains of the AP; or 2.) The aggregated set of channels used by the VAP clients assigned to the AP is greater than the number of radio chains of the AP.

In the first case above, it may be possible for the AP to simply listen to each of the channels at the same time. However, this is not an option in the second case. Even when listening to all channels is possible, it may still be more desirable to only listen to a subset of the channels. For example, if the AP is to use beamforming, this will require the AP to use multiple radio chains for a single channel (e.g., by operating the radio chains at different times so as to be out of phase), potentially reducing the number of channels to which the AP can listen at a given time. In either case, therefore, it may be beneficial to use the scheduling techniques below, to allow the AP to still service all of its VAP clients.

According to various embodiments, supervisory device 304 may form VAPs by optimizing the AP assignments based on the channels used by the VAP clients/nodes serviced by the VAPs. For example, when there is a high density of APs in a given area, supervisory device 304 may select the groups of APs in a VAP, in order to minimize the number of channels to which they need to listen. For example, assume that APs 302e-302f each have four radio chains. By assigning APs 302e-302f to service nodes 306a-306c, each AP only needs to listen to two channels: channel A and channel B. In doing so, this leaves two of the other radio chains available for beamforming.

Beamforming may be particularly useful when a VAP client is drifting away from the set of APs assigned to the VAP. For example, as shown in FIG. 6B, assume that node 306b is moving away from both of APs 302e-302f. By optimizing the assignment of VAPs and VAP clients to the APs based on the channel usages, this potentially allows one or more of the APs to use is available/unused radio chains for purposes of beamforming. In addition, in some embodiments, supervisory device 304 may designate one or more of the APs as dedicated for "far" clients, meaning that they need more than one radio chain for a given channel to perform beamforming. For example, in FIG. 6B, supervisory device 304 may designate AP 302e as dedicated for long distance communications, which can then use three of its radio chains to beamform communications with node 306b on channel B, while still using its remaining radio chain to listen to channel A.

When a new VAP-enabled client/node enters into the area, supervisory device 304 may continue to try and optimize the AP assignments based on the channel usages. For example, when a new node enters the area, supervisory device 304 may first attempt to assign that node to an AP or set of APs that are already listening to the channel used by that VAP client. If none or not enough are found, then supervisory device 304 may assign the client/node to the AP(s) that have the most available radio chains.

As noted, in addition to seeking to optimize the AP assignments based on the channels used by the VAP clients, the techniques herein also introduce a scheduling mechanism whereby an AP is not required to listen to the full set of client channels at any given time. FIGS. 7A-7D illustrate an example of implementing a communication schedule in a VAP, according to various embodiments.

Figure 7A:
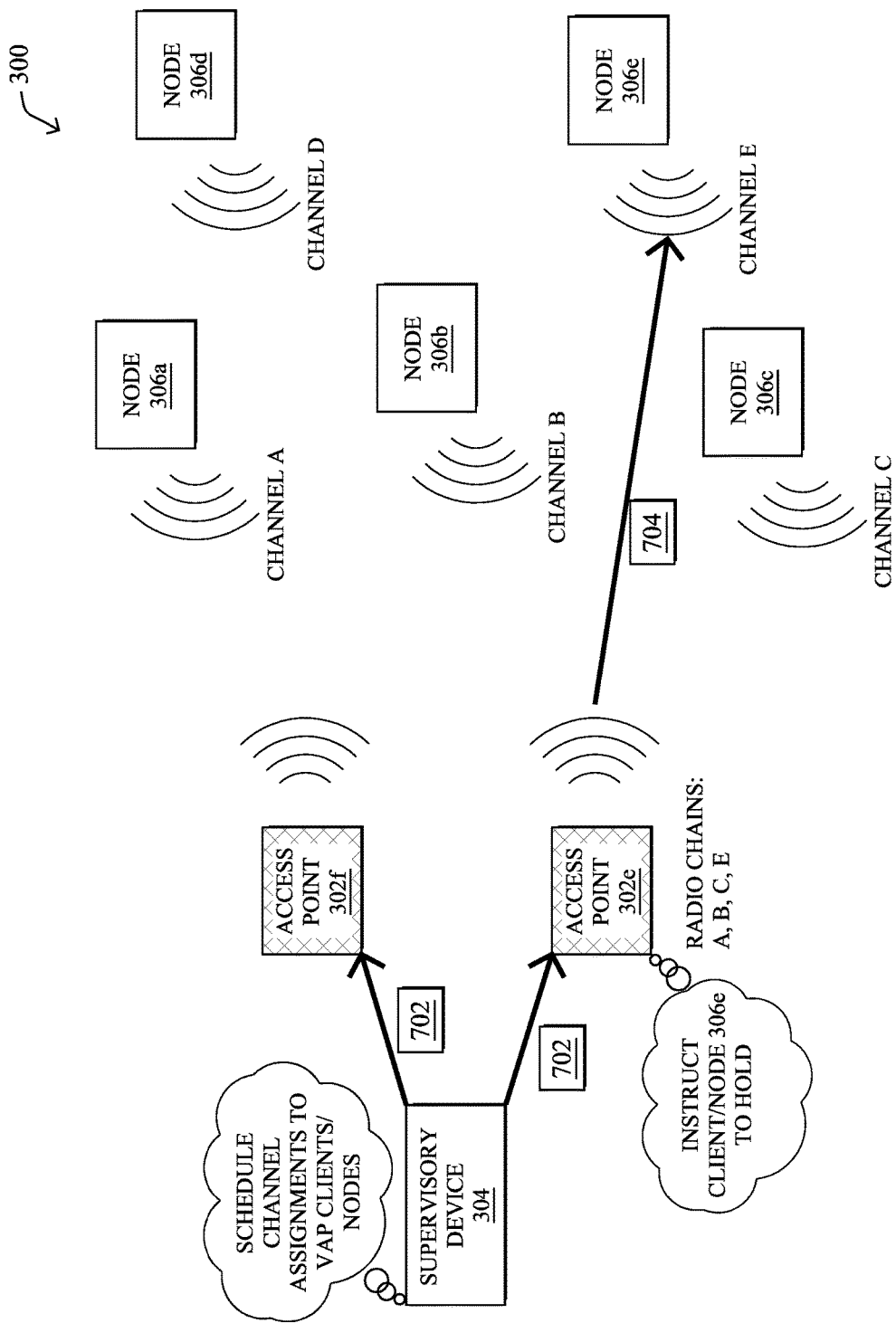
FIGS. 7A-7D illustrate an example of implementing a communication schedule in a VAP.

As shown in FIG. 7A, assume that there are VAP clients/nodes 306a-306e in a given location that use wireless channels A-E, respectively. Further, assume that APs 302e-302f are within communication range of nodes 306a-306e, each AP having only four total radio chains. Thus, if supervisory device 304 assigns APs 302e-302f to service each of nodes 306a-306e, the APs will not be able to listen to each of channels A-E at all times. In various embodiments, supervisory device 304 may determine communication schedules for each of the channels A-E (and, consequently for nodes 306a-306e), whereby any given AP 302 listens to only a subset of these channels during a given period of time. In turn, supervisory device 304 may send instructions 702 to access point 302e and/or access point 302f indicative of the determined communication schedule.

As would be appreciated by one skilled in the art, scheduling does not currently exist in Wi-Fi, as it does in other standards, such as 6TiSCH. Accordingly, it may not be possible for an AP 302 to simply inform a given node 306 of its communication schedule. However, using the techniques herein, existing Wi-Fi mechanisms can still be used to implement such a communication schedule. Notably, Wi-Fi and similar protocols include mechanisms to indicate that a STA/node should go offline for a period of time.

In various embodiments, an AP 302 may send a unicast instruction to a particular node 306 that the node should stop transmitting for a period of time. In doing so, this allows the AP to service other nodes, such as by using the radio chain(s) associated with the particular node to service other nodes, either by listening to other channels in the meantime or by using the radio chain(s) to beamform for another node.

For example, as shown, assume that AP 302e is currently using its radio chains to listen to channels A, B, C, and E, but is also assigned to node 306d, which communicates on channel D. In such a case, the communication schedule determined by supervisory device 304 may indicate that AP 302e is to leave channel E to instead listen on channel D. To ensure that node 306e does not communicate during the time while AP 302e is no longer on channel E, AP 302e (and/or 302f) may send instruction 704 as a unicast message to node 306e, to prevent node 306e from transmitting during this time.

Instruction 704 may take any number of different forms, in accordance with Wi-Fi. For example, in one embodiment, instruction 704 may be a unicast management frame (e.g., null frame) with a duration/ID field whose value reflects the time AP 302e intends to spend off channel (e.g., not on channel E). In doing so, node 306e may hold off on transmitting during the indicated time.

In another embodiment, AP 302e may send a transmission opportunity (TXOP) parameter to node 306e via instruction 704 with a low value for the traffic type expected from node 306e. For example, assume that node 306e is an IoT object that sends sensor reading reports tagged with a user priority (UP) 6. In such a case, AP 302e may send a TXOP to node 306e with a UP 6 value set to '1.' Doing so means that node 306e is only allowed to send a single frame during the next service period. Once node 306e has sent that single frame, AP 302e is free to leave channel E for the rest of the service period.

Figure 7B:
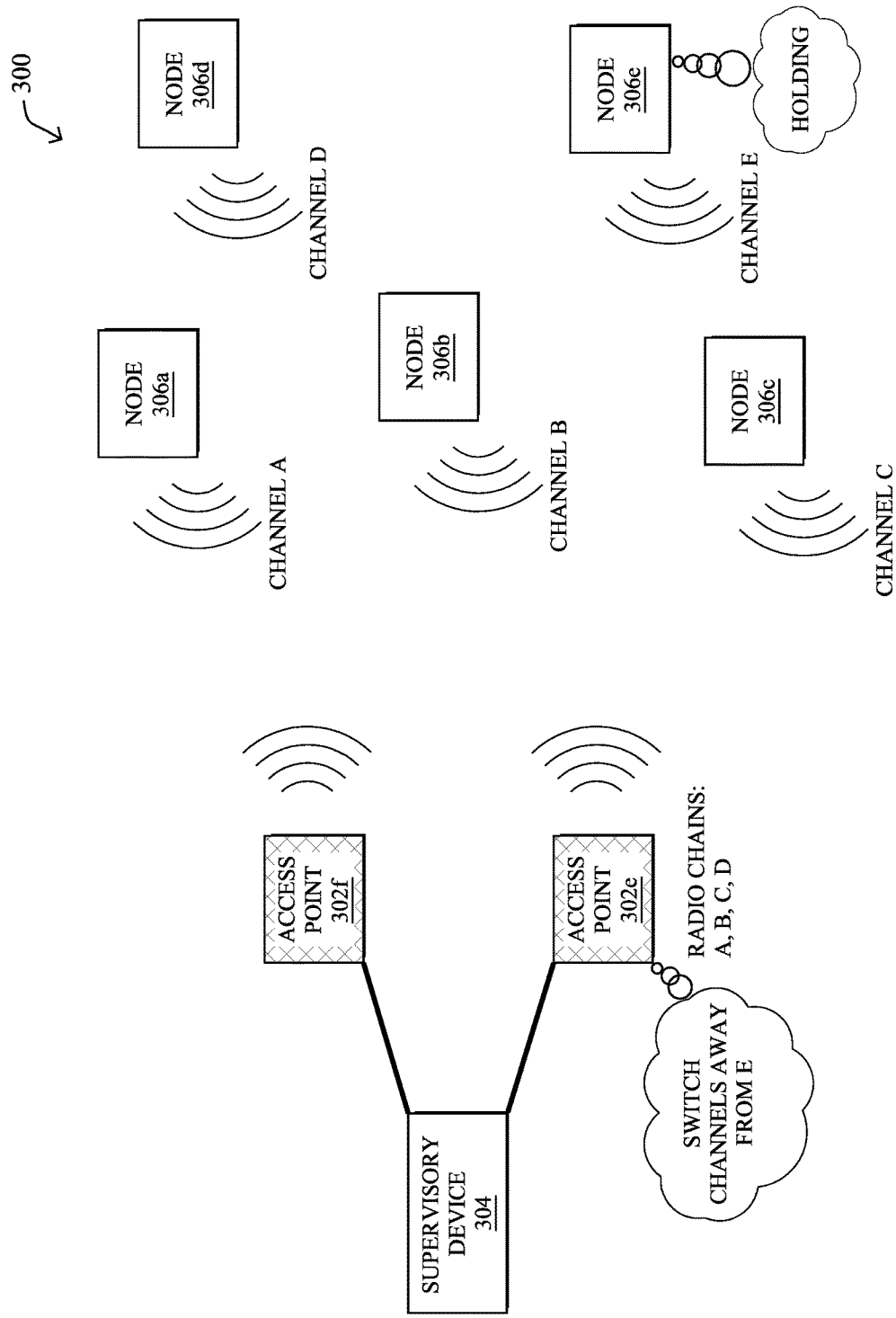
Figure 7C:
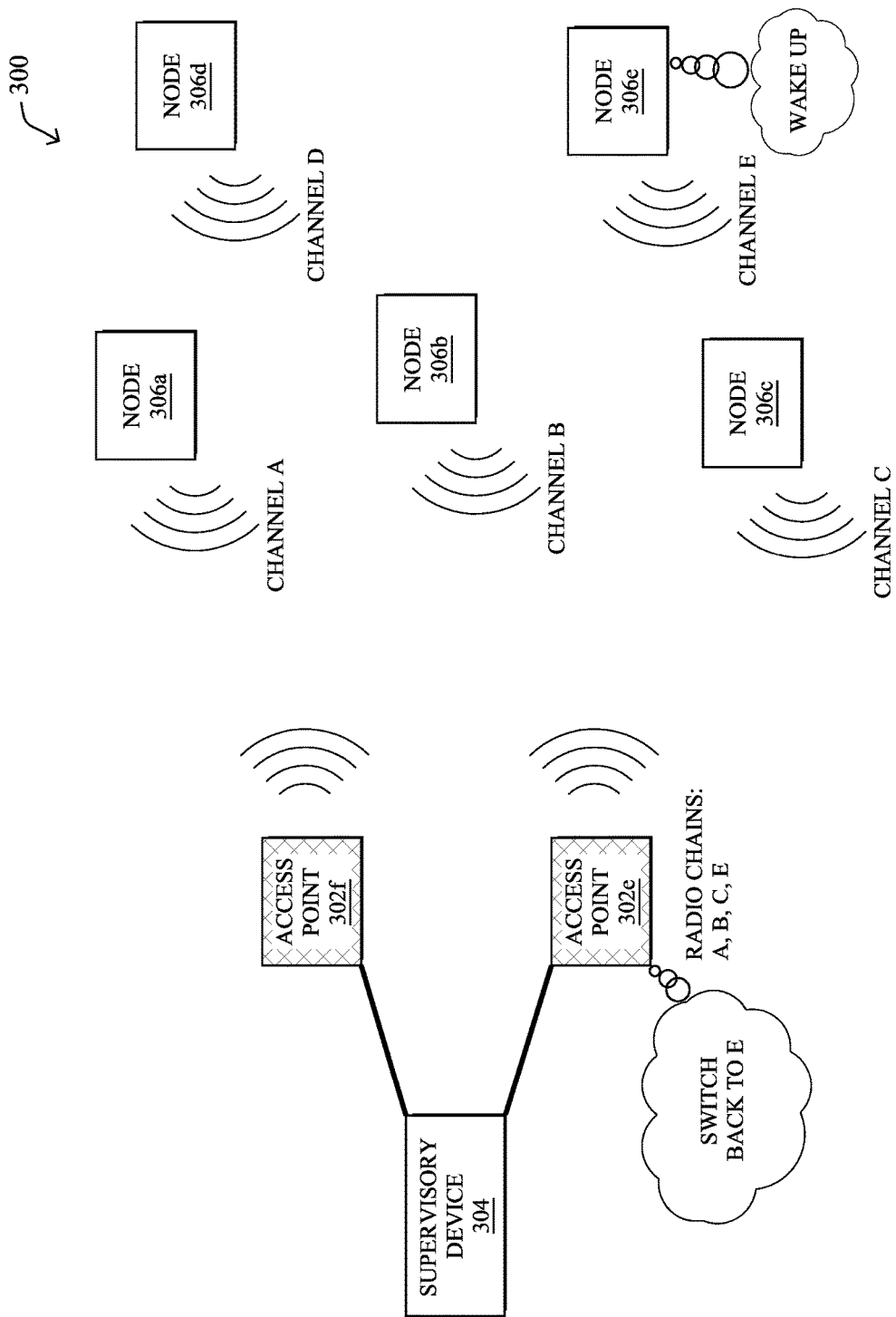

As shown in FIG. 7B, once node 306e has been instructed to hold off on its transmissions, AP 302e may change its corresponding radio chain from channel E to channel D, thereby allowing node 306d to communicate with AP 302e during this time. In turn, as shown in FIG. 7C, once this time period designated by the communication schedule has ended, AP 302e may return its radio chain(s) to channel E, node 306e may wake, and AP 302e and node 306e can continue to communicate with one another.

Figure 7D:
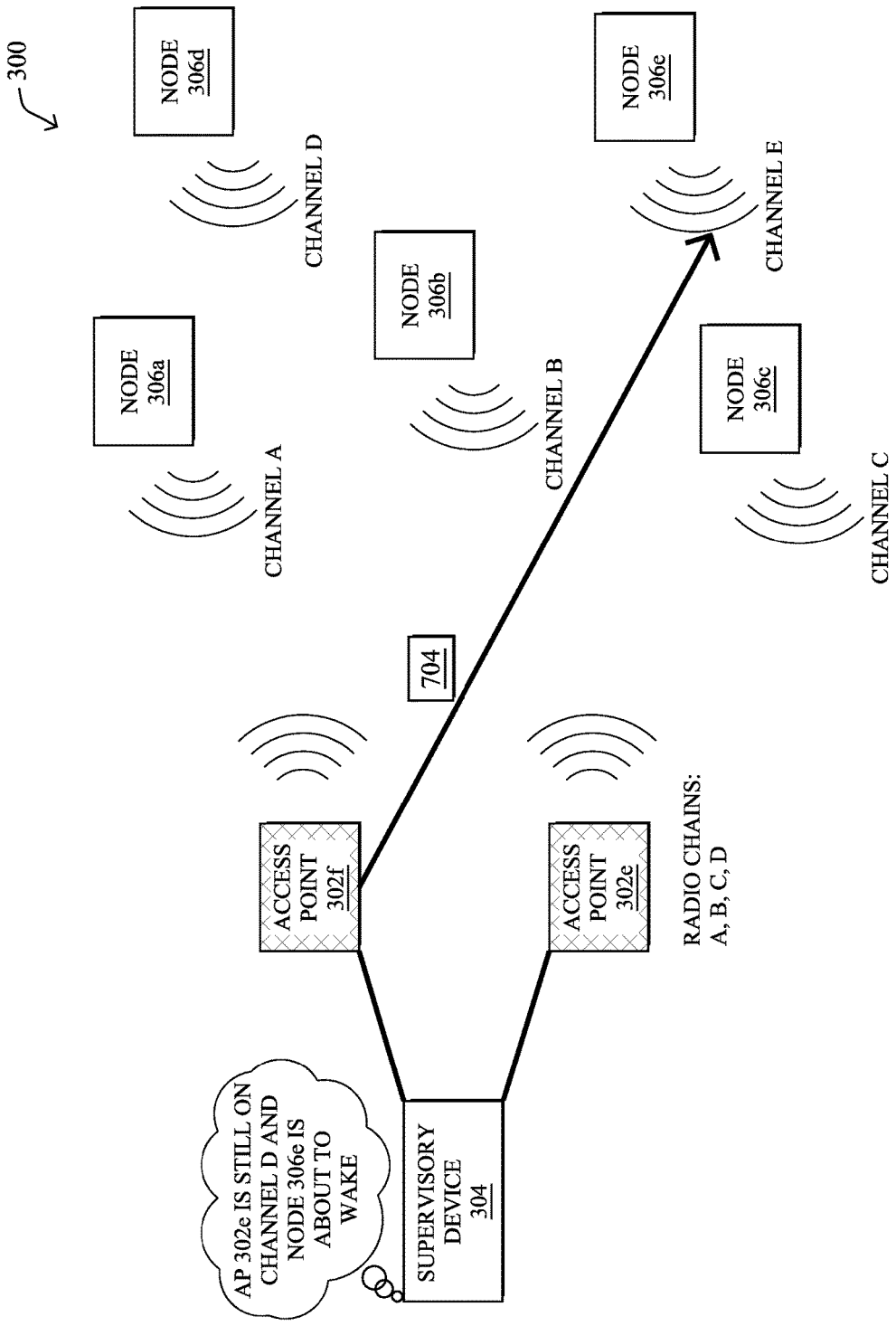

Note that there may still be cases in which AP 302e is unable to return to channel E in time for node 306e to resume communicating. In such cases, in some embodiments, supervisory device 304 may select one or more APs 302 to send periodic instructions to node 306e to continue to hold. For example, as shown in FIG. 7D, assume that AP 302e is still off of channel E and that node 306e is about to wake (e.g., begin communicating again). In such a case, supervisory device 304 may cause AP 306f to send instruction 704 to node 306e, to cause node 306e to continue to hold/sleep beyond the end of the original time period.

Of course, if node 306e wakes for whatever reason while AP 302e is still off channel, existing 802.11 mechanisms will still cause node 306e to send a frame, fail to receive an ACK from AP 302e, wait an extended interframe space (EIFS), and then double the contention window between each transmission attempt. In doing so, this would still allow AP 502e to complete its off channel activity with limited risk of losses. This flexibility built into 802.11 also limits the requirement for strict clock synchronization between elements of the system.

It may also be the case that the schedule at which 2 VAP-enabled clients that contend for a same radio chain in an AP must be somehow synchronized. In one embodiment, the supervisory device may effectively uses the whole network in a synchronized time division multiplexing (TDM) fashion, and arrange to limit the number of channels that each AP has to listen to during any given time slot, in order to optimize the capability to beam form.

A client that needs more bandwidth may also be given more time slots/periods in which to communicate resulting in a communication schedule for a VAP that can be expressed in terms of channels/time slots. Note that the time slots may also be shared by multiple VAP clients that operate on the same channel, depending on how the hold command is formulated.

As would be appreciated, the above scheduling technique can also be used in a similar manner to perform beamforming. For example, AP 302e may send instructions 704 to nodes 306a and 306b, to free up their corresponding radio chain, thereby dedicating three of its radio chains to channel D and one of its radio chains to channel C. In turn, these three radio chains can be used to beamform with node 306d on channel D.

By way of a use-case example of the techniques herein, assume that there is a factory floor with static wireless cameras and sets of sensors on static machines. For purposes of simplicity, also assume that, in a given location, two radio chains are available. Each client type has its own SSID and may reside on a different channel. Now, suppose that two other mobile robots, residing on multiple different channel and virtual APs, converge to that location. At that point, there will not be enough radio chains to cover all three client types, with 3 channels in use by the VAP clients and 3 VAPs.

Using the techniques herein for the above use-case example, a physical radio of the AP can indicate to one of the clients (e.g., a robot) that the radio is sending a set of frames (keeping the client on hold for the Rx/Tx function) while the radio switches to another virtual channel (e.g. that of the sensors) to service clients, before putting them on hold and coming back to serve the robot channel. This dynamic scheduling allows the AP to service more channels than there are radios available when needed. In some embodiments, machine learning can also be used to ensure that both virtual channels do not represent more than 100% of the expected required airtime for both VAPs (+hop time).

In an extension of this scenario, suppose that the floor needs only 2 channels (e.g., static wireless cameras, sensors), and that 5 radio chains are available in the APs. The techniques herein allow the radios to coordinate their effort and use beamforming to extend the range or the throughput to the associated clients. This aspect can also be combined with the above. For example, neighboring radios may use beamforming to temporarily relieve the local two radio chains and provide temporal coverage for any of the three needed VAPs clients at the edge. This coverage would not have been possible with a single radio chain and multiple beamforming from neighboring APs thus reduces the scope of the required channel sharing needed from the local radio. In other words, if one client is toward the edge of the radio cell, that radio can spend more time on another channel while coordinated neighboring APs take care of that edge client's traffic delivery (e.g., using beamforming).

Figure 8:
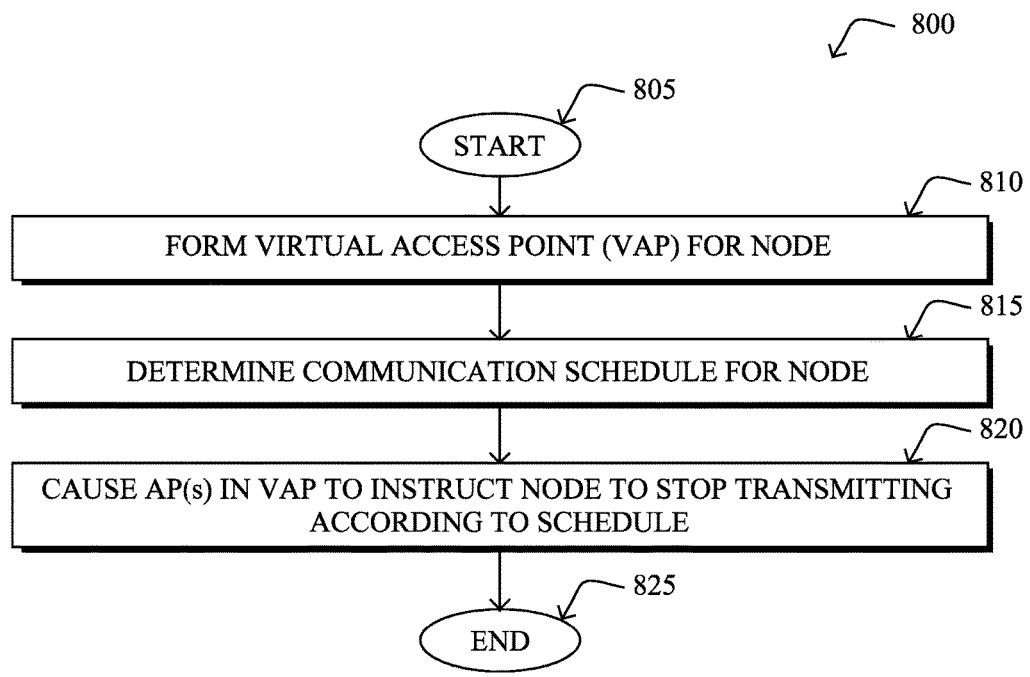
FIG. 8 illustrates an example simplified procedure for channel management in a VAP.

FIG. 8 illustrates an example simplified procedure for channel management in a VAP, according to various embodiments. For example, a non-generic, specifically configured device (e.g., device 200) may perform procedure 800 by executing stored instructions (e.g., process 248). Such a device may be, in some embodiments, a supervisory device, such as a wireless controller, in the network that oversees a plurality of APs in the network or, in further embodiments, a collection of one or more APs. The procedure 800 may start at step 805 and continue on to step 810 where, as described in greater detail above, the device may form a first virtual access point (VAP) in the network for a first node. A plurality of access points (APs) in the network are mapped to the VAP and the APs in the VAP mapping are treated as a single AP by the node for communicating with the network.

At step 815, as detailed above, the supervisory device may determine a communication schedule for the first node based on a radio chain of at least one of the APs in the VAP mapping for the first VAP being shared by the first VAP and a second VAP for a second node in the network. In particular, a given AP may be mapped to multiple VAPs and service multiple clients/nodes, each of which may be on the same or different wireless channels. In various embodiments, the supervisory device may determine a communication schedule that assigns the channels to time periods. In doing so, the AP may be able to service more channels than it has radio chains or, alternatively, free up some radio chains for purposes of beamforming.

At step 820, the supervisory device may, according to the communication schedule for the first node, cause one or more of the APs in the VAP mapping for the first VAP to instruct the first node to stop transmitting for a period of time, as described in greater detail above. In some embodiments, the one or more APs may do so by sending a unicast management frame to the first node indicative of a duration of the period of time. In other embodiments, the one or more APs may send a transmission opportunity (TXOP) to the first node with a low value for a traffic type expected from the first node. After the first node completes a transmission in accordance with the indicated TXOP, the AP in the VAP mapping for the first VAP may switch to a different channel to listen for communications from another node or re-dedicate the freed radio chain for purposes of beamforming. Procedure 800 then ends at step 825.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for optimized AP assignment and communication scheduling in a VAP-enabled environment. In doing so, APs are able to efficiently service multiple VAPs and VAP clients, as well as preserving the ability to beamform, as needed.

While there have been shown and described illustrative embodiments that provide techniques related to virtual access points (VAPs), it is to be understood that various other adaptations and modifications may be made within the spirit and scope of the embodiments herein. For example, while certain embodiments are described herein with respect to using certain environments, such as the IoT, other embodiments need not be limited to IoT devices. In addition, while certain protocols are shown, such as Wi-Fi, 802.15.4, LoRa, etc., other suitable protocols may be used, accordingly. For instance, while the techniques herein generally apply to a generalized CSMA/CA LLN, it should be specifically noted that the techniques can be applied to (based on) any of the standards mentioned above or known in the art. For ease of understanding (expecting the reader to be more familiar with the Wi-Fi parlance), the description above uses the term AP in the more general sense of a transceiver in a network. However, with Bluetooth LE, the central role illustratively maps to an AP, whereas the peripheral role is akin to the endpoint node. The same goes for the 802.15.4 PAN coordinator which is similar to an AP, and the full-function device (FFD) or reduced-function device (RFD) which illustratively map to an endpoint node, when 802.15.4 is used in plain hub-and-spoke (in that case a PAN ID illustratively serves as SSID). With DECT-ULE, the DECT Fixed Part is illustratively the AP, and the Portable Part is illustratively the node.

Note that some protocols on Wi-Fi networking refer to a "virtual access point" as many different things. For example, hosting several logical APs in one physical AP may be referred to as a "virtual access point", while turning a PC into an AP may also be referred to as a "virtual access point". The VAPs in this present disclosure should not be confused with the shared terminology, and is completely different in that one VAP herein is distributed over multiple physical APs, and there can be one VAP per STA.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    forming, by a supervisory device in a network, a first virtual access point (VAP) for a first node in the network, wherein a plurality of access points (APs) in the network are mapped to the first VAP as part of a VAP mapping, and wherein the first node treats the APs in the VAP mapping as a single AP for purposes of communicating with the network;
    determining, by the supervisory device, a communication schedule for the first node based on a radio chain of at least one of the APs in the VAP mapping for the first VAP being shared by the first VAP and a second VAP for a second node in the network; and
    causing, by the supervisory device and according to the communication schedule for the first node, one or more of the APs in the VAP mapping for the first VAP to instruct the first node to stop transmitting for a period of time.

2. The method as in claim 1, wherein the APs are Wi-Fi access points.

3. The method as in claim 1, wherein forming the first VAP comprises:
    selecting, by the supervisory device, the plurality of APs for mapping to the first VAP to minimize a number of wireless channels to which the APs listen.

4. The method as in claim 1, wherein forming the first VAP comprises:
   designating, by the supervisory device, one of the APs in the first VAP mapping to use multiple radio chains of the designated AP to beamform with the first node.

5. The method as in claim 1, wherein the radio chain is switched to a different channel than that of the first node during the period of time.

6. The method as in claim 5, further comprising:
   determining, by the supervisory device, that the radio chain of the AP will not be switched back to the channel of the first node by the end of the period of time; and, in response,
   causing, by the supervisory device, a second one of the APs in the VAP mapping for the first VAP to instruct the first node to continue to stop transmitting after the end of the period of time.

7. The method as in claim 5, wherein the different channel is associated with a second VAP for a second node.

8. The method as in claim 1, wherein causing the one or more APs to instruct the first node to stop transmitting for the period of time comprises:
   causing the one or more APs to send a unicast management frame to the first node indicative of a duration of the period of time.

9. The method as in claim 1, wherein causing the one or more APs to instruct the first node to stop transmitting for the period of time comprises:
   causing the one or more APs to send a transmission opportunity (TXOP) to the first node with a low value for a traffic type expected from the first node.

10. An apparatus, comprising:
    one or more network interfaces to communicate with a network;
    a processor coupled to the network interfaces and configured to execute one or more processes; and
    a memory configured to store a process executable by the processor, the process when executed configured to:
      forming a first virtual access point (VAP) for a first node in the network, wherein a plurality of access points (APs) in the network are mapped to the first VAP as part of a VAP mapping, and wherein the first node treats the APs in the VAP mapping as a single AP for purposes of communicating with the network;
      determine a communication schedule for the first node based on a radio chain of at least one of the APs in the VAP mapping for the first VAP being shared by the first VAP and a second VAP for a second node in the network; and
      cause, according to the communication schedule for the first node, one or more of the APs in the VAP mapping for the first VAP to instruct the first node to stop transmitting for a period of time.

11. The apparatus as in claim 10, wherein the APs are Wi-Fi access points.

12. The apparatus as in claim 10, wherein the apparatus forms the first VAP by:
    selecting the plurality of APs for mapping to the first VAP to minimize a number of wireless channels to which the APs listen.

13. The apparatus as in claim 10, wherein the apparatus forms the first VAP by:
    designating one of the APs in the first VAP mapping to use multiple radio chains of the designated AP to beamform with the first node.

14. The apparatus as in claim 10, wherein the radio chain is switched to a different channel than that of the first node during the period of time.

15. The apparatus as in claim 14, wherein the process when executed is further configured to:
    determine that the radio chain of the AP will not be switched back to the channel of the first node by the end of the period of time; and, in response,
    cause a second one of the APs in the VAP mapping for the first VAP to instruct the first node to continue to stop transmitting after the end of the period of time.

16. The apparatus as in claim 14, wherein the different channel is associated with a second VAP for a second node.

17. The apparatus as in claim 10, wherein the apparatus causes the one or more APs to instruct the first node to stop transmitting for the period of time by:
    causing the one or more APs to send a unicast management frame to the first node indicative of a duration of the period of time.

18. The apparatus as in claim 10, wherein the apparatus causes the one or more APs to instruct the first node to stop transmitting for the period of time by:
    causing the one or more APs to send a transmission opportunity (TXOP) to the first node with a low value for a traffic type expected from the first node.

19. A tangible, non-transitory, computer-readable medium storing program instructions that cause a supervisory device in a network to execute a process comprising:
    forming, by the supervisory device, a first virtual access point (VAP) for a first node in the network, wherein a plurality of access points (APs) in the network are mapped to the first VAP as part of a VAP mapping, and wherein the first node treats the APs in the VAP mapping as a single AP for purposes of communicating with the network;
    determining, by the supervisory device, a communication schedule for the first node based on a radio chain of at least one of the APs in the VAP mapping for the first VAP being shared by the first VAP and a second VAP for a second node in the network; and
    causing, by the supervisory device and according to the communication schedule for the first node, one or more of the APs in the VAP mapping for the first VAP to instruct the first node to stop transmitting for a period of time.

20. The tangible, non-transitory, computer-readable medium as in claim 19, wherein the radio chain is switched to a different channel than that of the first node during the period of time.

* * * * *